United States Patent
Koorapaty et al.

(10) Patent No.: US 11,064,515 B2
(45) Date of Patent: **\*Jul. 13, 2021**

(54) PHYSICAL UPLINK CONTROL CHANNEL (PUCCH) RESOURCE ALLOCATION

(71) Applicant: TELEFONAKTIEBOLAGET LM ERICSSON (PUBL), Stockholm (SE)

(72) Inventors: Havish Koorapaty, Saratoga, CA (US); Sorour Falahati, Stockholm (SE); Robert Baldemair, Solna (SE); Daniel Larsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/382,187

(22) Filed: Apr. 11, 2019

(65) Prior Publication Data

US 2019/0239247 A1  Aug. 1, 2019

Related U.S. Application Data

(63) Continuation of application No. 16/203,391, filed on Nov. 28, 2018, now Pat. No. 10,306,669, which is a (Continued)

(51) Int. Cl.
*H04W 72/12* (2009.01)
*H04L 5/00* (2006.01)
(Continued)

(52) U.S. Cl.
CPC ....... *H04W 72/1289* (2013.01); *H04L 1/1819* (2013.01); *H04L 5/0055* (2013.01);
(Continued)

(58) Field of Classification Search
None
See application file for complete search history.

(56) References Cited

U.S. PATENT DOCUMENTS

2014/0003452 A1\* 1/2014 Han .................. H04L 1/1657
370/474
2014/0126491 A1  5/2014 Ekpenyong et al.
(Continued)

FOREIGN PATENT DOCUMENTS

GB  2497468 A  6/2013
RU  2546594 C1  4/2015
(Continued)

OTHER PUBLICATIONS

First Action Interview Pilot Program Pre-Interview Communication for U.S. Appl. No. 16/203,391, dated Feb. 25, 2019, 4 pages.
(Continued)

*Primary Examiner* — Eunsook Choi
(74) *Attorney, Agent, or Firm* — Withrow & Terranova, PLLC

(57) ABSTRACT

Systems and methods for determining an uplink control channel resource to use for transmitting uplink control information to a network node are disclosed. In some embodiments, a method performed by a wireless device comprises receiving a first downlink control channel message that schedules a first downlink shared channel transmission, receiving a second downlink control channel message that schedules a second downlink shared channel transmission, and determining an uplink control channel resource to use for transmitting uplink control information to a network node. The uplink control information comprises Hybrid Automatic Repeat Request (HARQ) feedback for both the first downlink transmission and the second downlink transmission, and determining the uplink control channel resources for transmitting the uplink control information comprises determining the uplink control channel resources based on: (a) signaling received from the network node and (b) resource determination performed by the wireless device based on a latest received one of the first downlink control
(Continued)

channel message and the second downlink control channel message. The method further comprises transmitting the uplink control information using the determined uplink control channel resource.

20 Claims, 12 Drawing Sheets

Related U.S. Application Data continuation of application No. PCT/IB2018/058400, filed on Oct. 26, 2018.

(60) Provisional application No. 62/577,578, filed on Oct. 26, 2017.

(51) Int. Cl.
| | | |
|---|---|---|
| *H04W 88/02* | (2009.01) | |
| *H04L 1/18* | (2006.01) | |
| *H04W 76/27* | (2018.01) | |
| *H04W 72/02* | (2009.01) | |
| *H04W 72/04* | (2009.01) | |

(52) U.S. Cl.
CPC ....... *H04W 72/02* (2013.01); *H04W 72/0406* (2013.01); *H04W 72/0446* (2013.01); *H04W 76/27* (2018.02); *H04W 88/023* (2013.01)

(56) References Cited

U.S. PATENT DOCUMENTS

| | | | |
|---|---|---|---|
| 2015/0181588 A1 | 6/2015 | Song et al. | |
| 2016/0127105 A1 | 5/2016 | Park | |
| 2016/0165591 A1 | 6/2016 | Li et al. | |
| 2017/0070988 A1 | 3/2017 | Aiba et al. | |
| 2018/0054280 A1* | 2/2018 | Fu | H04L 1/1812 |
| 2018/0097609 A1* | 4/2018 | Tiirola | H04L 5/0053 |
| 2018/0102892 A1* | 4/2018 | Lunttila | H04L 1/1812 |
| 2018/0279351 A1* | 9/2018 | Shimezawa | H04L 5/0053 |
| 2018/0295608 A1* | 10/2018 | Nguyen | H04L 5/0053 |
| 2019/0045533 A1 | 2/2019 | Chatterjee et al. | |
| 2019/0052332 A1* | 2/2019 | Shimezawa | H04W 72/042 |
| 2019/0132861 A1 | 5/2019 | Koorapaty et al. | |

FOREIGN PATENT DOCUMENTS

| | | | |
|---|---|---|---|
| WO | 2011125004 A1 | 10/2011 | |
| WO | 2012/050389 A1 | 4/2012 | |
| WO | 2013025154 A1 | 2/2013 | |
| WO | 2014046592 A1 | 3/2014 | |
| WO | 2014/051508 A1 | 4/2014 | |
| WO | 2015037250 A1 | 3/2015 | |

OTHER PUBLICATIONS

Notice of Allowance and Applicant-Initiated Interview Summary for U.S. Appl. No. 16/203,391, dated Mar. 13, 2019, 11 pages.
International Search Report and Written Opinion for International Patent Application No. PCT/IB2018/058400, dated Feb. 28, 2019, 11 pages.
Oppo, "Summary of offline discussions for PUCCH resource allocation until Oct. 11," R1-1719015, 3GPP TSG RAN WG1 Meeting 90bis, Oct. 9-13, 2017, Prague, CZ, 10 pages.
First Office Action for Chinese Patent Application No. 201880003042.7, dated Dec. 27, 2019, 20 pages.
CATT, "Flexible reuse of DL control resources for data transmission," R1-1710079, 3GPP TSG RAN WG1 Ad-Hoc#2, Jun. 27-30, 2017, Qingdao, P.R., 4 pages.
Ericsson, "On HARQ Management," R1-1718645, 3GPP TSG RAN1 WG1 Meeting #90bis, Oct. 9-13, 2017, Prague, Czech Republic, 10 pages.
Ericsson, "On PUCCH Resource Allocation," R1-1718811, 3GPP WG1 Meeting#90bis, Oct. 9-13, 2017, Prague, Czech Republic, 11 pages.
Guangdong Oppo Mobile Telecom, "Impact on common channel reception to PDCCH design," R1-1713272, 3GPP TSG RAN WG1 Meeting #90, Aug. 21-25, 2017, Prague, Czech.
Oppo, "Summary of offline discussions for PUCCH resource allocation until Oct. 13" R1-1719168, 3GPP TSG RAN WG1 Meeting 90bis, Oct. 9-13, 2017, Prague, CZ, 9 pages.
Qualcomm, "Resource allocation for PUCCH," R1-1718806, 3GPP TSG RAN WG1 Meeting #90b, Oct. 9-13, 2017, Prague, CZ, 10 pages.
Sony, "Remaining issues on pre-emption indicator," R1-1716251, 3GPP TSG RAN WG1 Meeting NR#3, Sep. 18-21, 2017, Nagoya, Japan, 6 pages.
Speadtrum Communications, "Considerations on PUCCH resource allocation for NR," R1-1717749, 3GPP TSG RAN WG1 Meeting 90bis, Oct. 9-13, 2017, Prague, CZ, 4 pages.
ZTE, "Resource sharing between PDCCH and PDSCH," R1-1707163, 3GPP TSG RAN WG1 Meeting #89, May 15-19, 2017, Hangzhou, China, 9 pages.
Office Action for Japanese Patent Application No. 2019-517389, dated Nov. 8, 2019, 14 pages.
Second Office Action for Chinese Patent Application No. 201880003042.7, dated Jul. 8, 2020, 21 pages.
Official Action for Russian Patent Application No. 2020112890, dated Jun. 17, 2020, 13 pages.
Examination Report for Indian Patent Application No. 201937000500, dated Nov. 27, 2020, 6 pages.
Examination Report for European Patent Application No. 18807700.2, dated Apr. 6, 2021, 5 pages.
Notification of Reason for Refusal for Korean Patent Application No. 10-2020-7009460, dated Apr. 1, 2021, 13 pages.

\* cited by examiner

PHYSICAL UPLINK CONTROL CHANNEL (PUCCH) RESOURCE ALLOCATION

RELATED APPLICATIONS

This application is a continuation of U.S. patent application Ser. No. 16/203,391, filed Nov. 28, 2018, which is a continuation of International Patent Application No. PCT/IB2018/058400, filed Oct. 26, 2018, which claims the benefit of provisional patent application Ser. No. 62/577,578, filed Oct. 26, 2017, the disclosure of which are hereby incorporated herein by reference in their entirety.

TECHNICAL FIELD

The present disclosure relates to a cellular communications network and, more specifically, Physical Uplink Control Channel (PUCCH) resource allocation.

BACKGROUND

Operation of New Radio (NR) requires the transmission of various control information from the wireless device (e.g., User Equipment (UE)) to the network. Examples of such Uplink Control Information (UCI) are Hybrid Automatic Repeat Request (HARQ) Acknowledgements (ACKs), Channel State Information (CSI), and Scheduling Request (SR). The UCI can be transmitted on a separate control channel (e.g., occurring either at the end of the slot interval or during the slot interval), or the UCI can be multiplexed with data and transmitted on a data channel. For example, the separate control channel could be a Physical Uplink Control Channel (PUCCH). As another example, the data channel could be a Physical Uplink Shared Channel (PUSCH), e.g., supporting "UCI on PUSCH."

PUCCH Format

There are multiple formats defined for PUCCH that can be used to transmit control information, as shown in the table below.

TABLE 1

Possible PUCCH format definitions

| PUCCH format | Number of symbols in a slot | Number of UCI bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH formats 0 and 2 are referred to as short PUCCH formats since they are transmitted only over 1 or two Orthogonal Frequency Division Multiplexing (OFDM) symbols in a slot. PUCCH formats 1, 3, and 4 are referred to as long PUCCH formats since they can be transmitted in up to 14 OFDM symbols (without slot aggregation) and even across multiple slots if PUCCH slot aggregation is configured. As shown in the table, each both long and short PUCCH formats are subdivided depending on the number of UCI bits they may contain.

A single slot may contain multiple transmissions of a single PUCCH format as well as multiple PUCCH formats which may or may not be transmitted by the same UE. For instance, a slot spanning 14 OFDM symbols may contain a long PUCCH spanning 12 OFDM symbols followed by a short PUCCH spanning two OFDM symbols.

The different PUCCH formats are used for different purposes. The PUCCH formats that contain 2 bits or less can generally multiplex multiple UEs in the same time and frequency resources with the long PUCCH being able to multiplex more users than the short PUCCH. PUCCH format 4 can multiplex multiple UEs with each UE having more than 2 bits.

PUCCH Resources

A PUCCH resource that is used by a UE to transmit UCI may be defined by the Physical Resource Blocks (PRBs), the OFDM symbols, the sequences along with their cyclic shifts, and Orthogonal Cover Codes (OCCs) used. It should be noted that OCCs, sequences, and cyclic shifts are applicable only for some PUCCH formats.

In any given slot, the UE may have to transmit one or more of the following:

HARQ ACKs
CSI
SRs

CSI information may be scheduled to be transmitted periodically, e.g., once every N slots. SR is transmitted by the UE when the UE has some data to be sent. HARQ ACK information is transmitted to acknowledge whether Physical Downlink Shared Channel (PDSCH) transmissions in the downlink were successfully received or not. HARQ ACKs may consist of a single bit to acknowledge an entire transport block or multiple bits, each representing a Code Block Group (CBG), i.e., a set of code blocks among the code blocks that comprise a transport block.

Determination of PUCCH Resources

The PUCCH resource to be used for each of the different types of UCI can generally be controlled by the NR base station (gNB). This can be done via explicit resource assignments either through semi-static configuration (e.g., Radio Resource Control (RRC) signaling) or through dynamic signaling of Downlink Control Information (DCI) messages.

In addition, the UE can also determine PUCCH resources implicitly. For example, the PUCCH resource can be determined based on the number of UCI bits to be transmitted in a slot. PUCCH resources for HARQ ACK transmission for a scheduled PDSCH may also be determined implicitly by the Control Channel Element (CCE) at which the received control channel message (PDCCH) scheduling the PDSCH begins. This approach is used in Long Term Evolution (LTE). Such implicit resource determination can reduce the overhead incurred for dynamic signaling and help to avoid collisions between the PUCCH resources determined by different UEs for transmission of UCI.

Since the gNB is generally aware of the number of bits to be transmitted by the UE, or which resources to expect autonomous transmissions by the UE such as SR, the gNB is aware of the resources on which all the UCI information must be received. There are certain error cases where a mismatch can occur between the UE and the gNB on the resources to be used for PUCCH transmission, e.g., when certain downlink assignments for PDSCH are missed. However, such mismatches occur with a very small probability and can sometimes be handled either by the gNB performing decoding on multiple hypothesized PUCCH resources.

There is a need for improved systems and methods for PUCCH resource determination, particularly ones that provide additional flexibility.

SUMMARY

Systems and methods for determining an uplink control channel resource to use for transmitting uplink control information to a network node are disclosed. In some embodiments, a method performed by a wireless device comprises receiving a first downlink control channel message that schedules a first downlink shared channel transmission, receiving a second downlink control channel message that schedules a second downlink shared channel transmission, and determining an uplink control channel resource to use for transmitting uplink control information to a network node. The uplink control information comprises Hybrid Automatic Repeat Request (HARQ) feedback for both the first downlink transmission and the second downlink transmission, and determining the uplink control channel resource for transmitting the uplink control information comprises determining the uplink control channel resource based on: (a) signaling received from the network node and (b) resource determination performed by the wireless device based on a latest received one of the first downlink control channel message and the second downlink control channel message. The method further comprises transmitting the uplink control information using the determined uplink control channel resource.

In some embodiments, the uplink control channel is a physical uplink control channel.

In some embodiments, the signaling received from the network node comprises information that provides a semi-static configuration of two or more uplink control channel resource sets each comprising two or more uplink control channel resources, and determining the uplink control channel resource based on: (a) the signaling received from the network node and (b) resource determination performed by the wireless device based on the latest received one of the first downlink control channel and the second downlink control channel messages comprises selecting one of the two or more uplink control channel resource sets and selecting, as the uplink control channel resource to use for transmitting the uplink control information to the network node, one of the uplink control channel resources from the selected uplink control channel resource set based on dynamic signaling from the network node. In some embodiments, each of the first downlink control channel message and the second downlink control channel message comprises a downlink control information message comprising bits for use to select one of the uplink control channel resources from the selected uplink control channel resource set, and selecting the one of the uplink control channel resources from the selected uplink control channel resource set based on dynamic signaling from the network node comprises selecting, as the uplink control channel resource to use for transmitting the uplink control information to the network node, the one of the uplink control channel resources from the selected uplink control channel resource set based on the bits for use to select one of the uplink control channel resources from the selected uplink control channel resource set that are comprised in the latest one of the first downlink control channel and the second downlink control channel.

In some embodiments, the determining which resources of the control channel to use is performed when the timing is variable between when the wireless device receives a message scheduling a downlink transmission and when the wireless device transmits the uplink control information.

In some embodiments, the determining which resources of the control channel to use is performed when the wireless device can receive a message scheduling a downlink transmission in any one of multiple control regions in the same slot.

In some other embodiments, a method performed by a wireless device comprises receiving a downlink control channel that schedules a downlink shared channel transmission to the wireless device and determining an uplink control channel resource to use for transmitting uplink control information to a network node, wherein the uplink control information comprises HARQ feedback for the downlink shared channel transmission and determining the uplink control channel resource comprises selecting the uplink control channel resource from uplink control channel resources in two or more uplink control channel resource sets based on a payload size of the uplink control information, a starting control channel element index of a downlink control channel candidate on which the downlink control channel was received, and dynamic signaling received from the network node. The method further comprises transmitting the uplink control information using the determined uplink control channel resource.

In some embodiments, the method further comprises receiving, from the network node, signaling comprising information that provides a semi-static configuration of two or more uplink control channel resource sets each comprising two or more uplink control channel resources. Further, selecting the uplink control channel resource from the uplink control channel resources in the two or more uplink control channel resource sets comprises selecting one of the two or more uplink control channel resource sets and selecting, as the uplink control channel resource to use for transmitting the uplink control information to the network node, one of the uplink control channel resources from the selected uplink control channel resource set based on dynamic signaling from the network node. In some embodiments, the downlink control channel comprises a downlink control information message comprising bits for use to select one of the uplink control channel resources from the selected uplink control channel resource set, and selecting the one of the uplink control channel resources from the selected uplink control channel resource set based on dynamic signaling from the network node comprises selecting, as the uplink control channel resource to use for transmitting the uplink control information to the network node, the one of the uplink control channel resources from the selected uplink control channel resource set based on the bits for use to select one of the uplink control channel resources from the selected uplink control channel resource set that are comprised in the downlink control channel.

In some embodiments, the method further comprises receiving, from the network node, signaling comprising information that provides a semi-static configuration of two or more uplink control channel resource sets each comprising two or more uplink control channel resources. Further, selecting the uplink control channel resource from the uplink control channel resources in the two or more uplink control channel resource sets comprises selecting one of the two or more uplink control channel resource sets based on dynamic signaling from the network node and selecting, as the uplink control channel resource to use for transmitting the uplink control information to the network node, one of the uplink control channel resources from the selected uplink control channel resource set using an implicit determination. In some embodiments, the implicit determination is based on a starting control channel element index of a downlink control channel candidate on which the downlink control channel was received, a search space in which the downlink control channel was received, or a CORESET in which the downlink control channel was received.

In some embodiments, the determining which resources of the control channel to use is performed when the timing is variable between when the wireless device receives a message scheduling a downlink transmission and when the wireless device transmits the uplink control information.

In some embodiments, the determining which resources of the control channel to use is performed when the wireless device can receive a message scheduling a downlink transmission in any one of multiple control regions in the same slot.

Embodiments of a wireless device are also disclosed. In some embodiments, a wireless device comprises an interface and processing circuitry configured to cause the wireless device to receive a first downlink control channel that schedules a first downlink shared channel transmission, receive a second downlink control channel that schedules a second downlink shared channel transmission, and determine an uplink control channel resource to use for transmitting uplink control information to a network node. The uplink control information comprises HARQ feedback for both the first downlink transmission and the second downlink transmission, and determining the uplink control channel resource for transmitting the uplink control information comprises determining the uplink control channel resource based on: (a) signaling received from the network node and (b) resource determination performed by the wireless device based on a latest received one of the first downlink control channel and the second downlink control channel. The processing circuitry is further configured to cause the wireless device to transmit the uplink control information using the determined uplink control channel resource.

In some embodiments, a wireless device comprises an interface and processing circuitry configured to cause the wireless device to receive a downlink control channel that schedules a downlink shared channel transmission to the wireless device and determine an uplink control channel resource to use for transmitting uplink control information to a network node. The uplink control information comprises HARQ feedback for the downlink shared channel transmission. In order to determine the uplink control channel resource, the processing circuitry is further configured to cause the wireless device to select the uplink control channel resource from uplink control channel resources in two or more uplink control channel resource sets based on a payload size of the uplink control information, a starting control channel element index of a downlink control channel candidate on which the downlink control channel was received, and dynamic signaling received from the network node. The processing circuitry is further configured to cause the wireless device to transmit the uplink control information using the determined uplink control channel resource.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
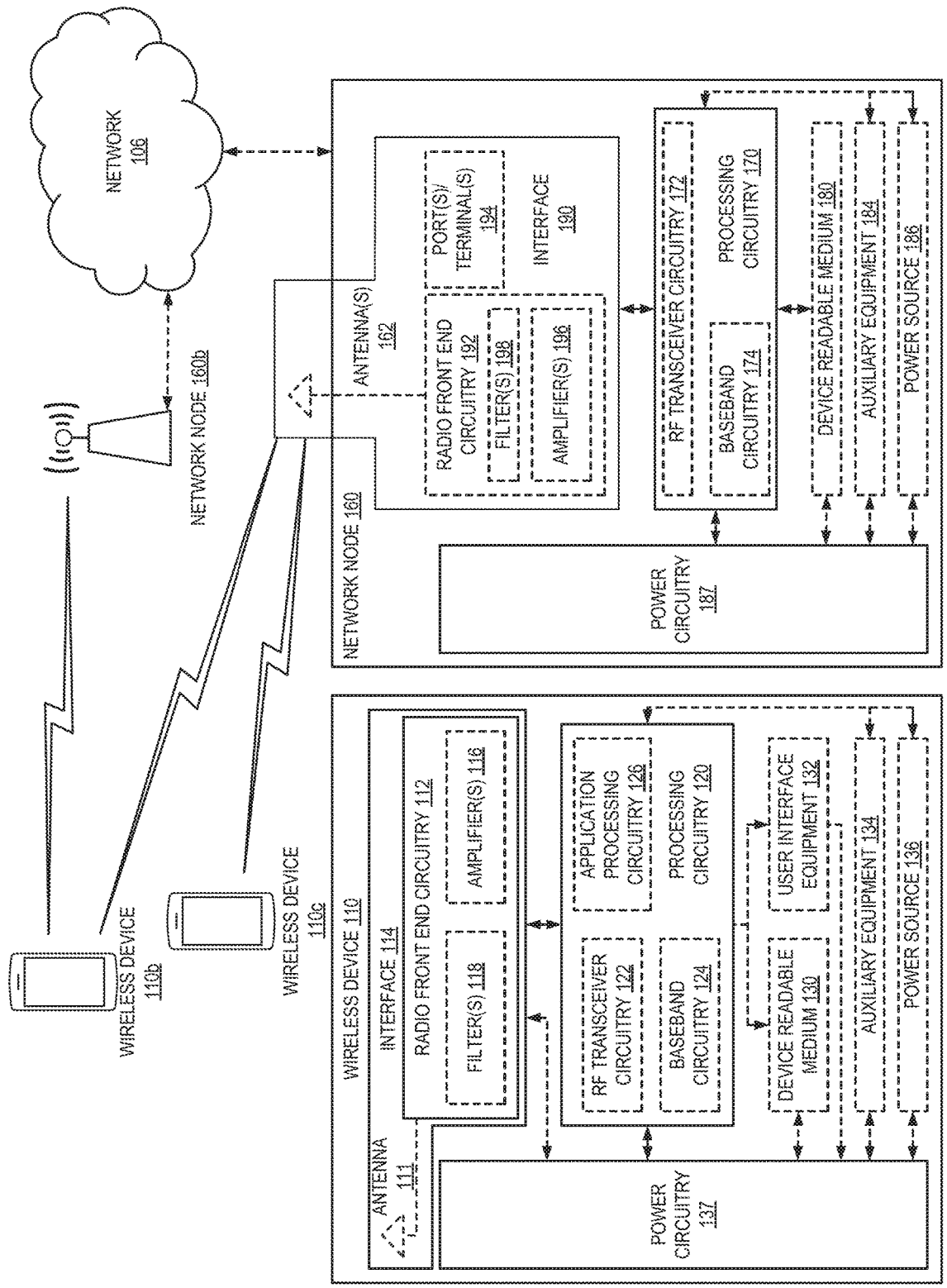
FIG. 1 illustrates an example wireless network in accordance with at least some aspects of the embodiments disclosed herein.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

There currently exist certain challenge(s) with respect to Physical Uplink Control Channel (PUCCH) resource determination. For example, existing solutions for determination of PUCCH resources use either explicit signaling such as a combination of semi-static (e.g., Radio Resource Control (RRC)) and dynamic (Downlink Control Information (DCI) messages) signaling or a combination of explicit signaling and implicit determination (e.g., use of starting Control Channel Element (CCE) index for Physical Downlink Control Channel (PDCCH)). The use of implicit methods for determination of PUCCH resources is used to reduce the signaling overhead and/or minimize collisions between the PUCCH resources for different User Equipments (UEs). The existing solutions that use implicit determination of PUCCH resources in this manner work well in systems such as Long Term Evolution (LTE) where the timing of the PUCCH carrying Hybrid Automatic Repeat Request (HARQ) Acknowledgement (HARQ ACK) feedback for a scheduled Physical Downlink Shared Channel (PDSCH) transmission is fixed. However, existing methods for implicit determination of PUCCH resources do not work well when the timing of transmissions between the reception of the PDCCH scheduling the PDSCH and the transmission of HARQ ACK feedback on the PUCCH is not fixed but is variable. Also, existing methods do not work well when the PDCCH scheduling the PDSCH can be received in any one of multiple control regions in the same slot.

Certain aspects of the present disclosure and their embodiments may provide solutions to these or other challenges. For example, in some embodiments, the UE uses a combination of explicit signaling and implicit resource determination to handle flexible timing of HARQ ACK feedback and the reception of PDCCH in different control regions (e.g., CORESETs) in a slot. The explicit signaling consists of a combination of RRC signaling (semi-static) and fields in DCI messages (dynamic).

In some embodiments, the RRC signaling can be used to configure different sets of PUCCH resources for different CORESETs in one or more slots from which implicit determination can be used to determine a PUCCH resource so that the resources in different sets are orthogonal to each other.

In other embodiments, the RRC signaling can be used to configure the same resource set for many more UEs than there are resources in the set with the UEs chosen having a lower probability of transmitting together. This could be because these UEs have very high data rate requirements so that they will likely not share resources with other UEs in the same slot.

In some embodiments, the dynamic signaling can be used to indicate a starting index relative to which PUCCH resources can be implicitly determined.

In some embodiments, the dynamic signaling can be used to indicate the slot index and/or PUCCH format to use.

In some embodiments, a common indexing method is used across multiple control regions for downlink and across multiple slots to avoid ambiguities in implicit PUCCH resource determination. In some embodiments, HARQ feedback for PDSCH received after an uplink grant for Uplink Control Information (UCI) on Physical Uplink Shared Channel (PUSCH) is treated differently than HARQ feedback for PDSCH received before the uplink grant. One example of different treatment is that a potential Code Block Group (CBG) configuration is not applied but transport block based feedback is used instead.

Certain embodiments may provide one or more of the following technical advantage(s). For example, certain embodiments may include the technical advantage of minimizing overhead for PUCCH resource allocation while keeping collisions between PUCCH resources assigned to different UEs to a minimum.

The general problem can be described as follows. In a given slot, a UE may have to transmit periodic or aperiodic Channel State Information (CSI) and/or HARQ ACK and/or Scheduling Requests (SRs). The UE must determine a PUCCH resource for this which includes a PUCCH format in a set of Physical Resource Blocks (PRBs) and Orthogonal Frequency Division Multiplexing (OFDM) symbols and potentially sequences, cyclic shifts, and Orthogonal Cover Codes (OCCs) depending on the PUCCH format used. The PUCCH resource is determined based on explicit signaling from the base station (i.e., the next generation Node B (gNB) in New Radio (NR) terminology) and possibly some implicit methods. The HARQ ACK transmissions may be for PDSCH transmissions that are received in one of multiple slots including in slot n. The following discussion provides examples of embodiments that enable determining of the PUCCH resource while minimizing overhead for dynamic signaling and collisions between the determined PUCCH resources for different UEs.

The embodiments are illustrated using the following example. A set of three slots, numbered n, n+1, and n+2, is considered. Slot n is a slot with only downlink transmissions, slot n+1 carries downlink transmissions followed by uplink transmissions, and slot n+2 carries only uplink transmissions. Slot n+1 can be used for transmissions of PUCCH formats 0 and 2, i.e., short PUCCH for up to 2 bits and for more than 2 bits. Slot n+2 can be used for transmissions of PUCCH formats 1 and 3 (long PUCCH for up to 2 bits and greater than 2 bits) followed by PUCCH formats 0 and 2 (short PUCCH formats for up to 2 bits and greater than 2 bits).

HARQ ACK for PDSCH received in slots n and n+1 can be sent in any of the PUCCH resources in slot n+1 or slot n+2 depending on the payload size including the HARQ ACK as well as potential CSI and SR transmissions. The first PUCCH resource that can be used in time is limited by the processing capability of the UE, i.e. how long time it takes to prepare a HARQ feedback transmission after the corresponding downlink transmission has been received.

Embodiment 1

In this embodiment, the set of all CORESETs across multiple slots are indexed using a common scheme and mapped to all the PUCCH resources across multiple slots that are also indexed using a common scheme. In the three slot example considered, all the PDCCH candidates in all the CORESETs in slots n and n+1 configured to the UE have a unique index. Similarly, all the PUCCH resources in slots n+1 and n+2 have a unique index. The PDCCH candidate indices are mapped to the PUCCH resource indices so that the resource where HARQ ACK transmissions should occur can be determined implicitly. The mapping from the PDCCH candidates to the PUCCH resources is semi-statically configured to each UE via RRC signaling. The semi-statically configured mapping depends on the number of CORESETs configured to the UE as well as on the upcoming slots carrying uplink transmissions in which PUCCH resources may be available.

It may be noted that, in this embodiment, delays in HARQ ACK feedback is controlled dynamically by choosing the appropriate PDCCH candidate for scheduling. The mapping of PDCCH candidates to PUCCH resources can be changed semi-statically, but not dynamically. This of course creates some scheduling constraints. Furthermore, it is not expected that a UE will be able to perform blind decodes to exhaustively search all candidates, which creates further restrictions in scheduling. For examples that provide greater flexibility to choose delay or other parameters dynamically, see embodiments 3-8 discussed below.

To make the above solution more dynamic, it can be considered to configure a UE with multiple such mappings and use dynamic information in the DCI to select one of the configured mappings.

For the case where RRC configuration information is not available, e.g., after initial access or during RRC reconfigurations, a default mapping is specified.

Embodiment 2

This embodiment is a simplification of Embodiment 1 where the indexing of PDCCH resources and PUCCH resources does not have to be unique. Instead, the RRC signaling can be used to configure different sets of PUCCH resources from which implicit determination can be used to determine a PUCCH resource, for different CORESETs in one or more slots so that the resources in the different sets corresponding to different CORESETs are orthogonal to each other. A default mapping for PUCCH resources can be configured when the CORESET is first configured. This default mapping may be used during RRC reconfigurations when the mapping to be used may be ambiguous.

After initial access when an RRC configuration is not available, a default mapping of PUCCH resources for the CORESET carrying the common search space where the Remaining System Information (RMSI) is received is specified.

Embodiment 3

In this embodiment, the UE is semi-statically configured with multiple PUCCH resource sets, where each of the elements of each of the PUCCH resource sets corresponds to a single PUCCH resource. A PUCCH resource set is chosen implicitly by the UE based on the UCI payload and one or more of the following when HARQ ACK feedback is part of the UCI:
  the CORESET where the PDCCH scheduling the PDSCH (i.e., the PDSCH transmission for which HARQ ACK feedback is to be provided) is received;
  the search space within the above CORESET (i.e., the search space within the above CORESET in which the PDCCH scheduling the PDSCH is received);
  the starting CCE index of the PDCCH candidate within the above search space (i.e., the starting CCE index of the PDCCH candidate within the above search space in which the PDCCH scheduling the PDSCH is received).

How the UE implicitly determines the PUCCH resource set based on the above factors can also be configured semi-statically. Dynamic signaling is used to select a PUCCH resource from within the implicitly selected PUCCH resource set.

An example PUCCH resource determination procedure as per this embodiment for the considered scenario with three slots is described as follows. First, a UE is semi-statically configured to choose a PUCCH resource set for each PDCCH candidate across all the CORESETs configured to the UE. A default mapping is configured for each CORESET that may be used during RRC reconfigurations. All the PUCCH resource sets have at least one entry corresponding to a short PUCCH format in slot n+1, a short PUCCH format in n+2, and a long PUCCH format in slot n+2. Then, a PUCCH resource for a PDSCH received in a particular slot is determined using the steps below:
  Whether a PUCCH format of up to 2 bits or greater than 2 bits is used is determined by the UE implicitly based on the payload size.
  The CCE index, the search space of the successfully received PDCCH, and optionally the identifier (Radio Network Temporary Identifier (RNTI)) used to scramble the PDCCH is then used to determine a single PUCCH resource set within the group of configured PUCCH resource sets corresponding to the chosen PUCCH format.
  Dynamic signaling (2 bits) in the DCI message is used to determine a single PUCCH resource from within the chosen PUCCH resource set.

This embodiment gives the gNB more flexibility to control the latency of the HARQ ACK feedback. To illustrate this, consider the following example configuration of PDCCH candidates, blind decodes, and PUCCH resources within the three slot example.

After initial access when an RRC configuration is not available, a default mapping of a PUCCH resource set for each of the PDCCH candidates in the CORESET carrying the common search space where the RMSI is received is specified. To handle the case where RRC configuration information is ambiguous during RRC reconfigurations, a default mapping of PUCCH resource sets for each of the PDCCH candidates in the CORESET is configured as part of the CORESET configuration.

Let us consider that slot n has two CORESETs configured to four different UEs. Each CORESET has two PDCCH candidates. The four PDCCH candidates are numbered 1, 2, 3, and 4 with PDCCH candidates 1 and 2 in the first CORESET and PDCCH candidates 3 and 4 in the second CORESET. Let us consider four PUCCH resources, A, B, C, and D with PUCCH resources A and B in slot n+1 and PUCCH resources C and D in slot n+2. Now, let's consider that there are four UEs, U1, U2, U3, and U4 with two blind decode PDCCH candidates each configured as follows:

| UE | Blind decode candidates |
| --- | --- |
| U1 | 1, 3 |
| U2 | 2, 4 |
| U3 | 1, 4 |
| U4 | 2, 3 |

Let us consider that the mapping as per Embodiment 1 from PDCCH candidate to PUCCH resources is {1, 2, 3, 4}=>{A, B, C, D}. Then, let us consider that UEs U1 and U3 are scheduled together. It is clear that once U1 is scheduled in PDCCH candidate 1, U3 can only be scheduled in PDCCH candidate 4; and since PDCCH candidate 4 is mapped to PUCCH resource D in slot n+2, U3 must suffer a two slot delay in getting its HARQ feedback.

Now let us consider that the mapping as per Embodiment 2 from PDCCH candidates to resources sets is {1, 2, 3, 4}=>{{A, C}, {B, D}, {B, D}, {A, C}}. Then if we consider, as in the case of the example for Embodiment 1 above that UEs U1 and U3 are scheduled together, U1 uses PUCCH resource set {A, C} and U3 uses PUCCH resource set {B, D}. Now with a single bit sent in the DCI message scheduling the PDSCH for each UE, the gNB can direct U1 to choose PUCCH resource A and U3 to choose PUCCH resource B, and the gNB can get HARQ ACK feedback for U3 in slot n+1 instead of slot n+2.

It will be apparent to those skilled in the art that this type of flexibility is provided by the inclusion of multiple alternatives in the PUCCH resource set chosen by the implicit determination and that the PUCCH resource sets can be configured to provide other types of flexibility. For instance, the PUCCH resource set could have multiple entries corresponding to different PUCCH formats so that the gNB can dynamically direct the UE to choose between the different formats, or the different entries in the chosen PUCCH set could correspond to PUCCH resources in different OFDM symbols within the same slot.

Embodiment 4

This embodiment differs from Embodiment 3 in that the dynamic signaling is used to first select a PUCCH resource set whose entries are restricted to a particular slot and a short or long PUCCH format with implicit PUCCH resource determination then being used to determine the PUCCH resource from within the PUCCH resource set. The steps for PUCCH resource determination for the considered scenario may be delineated as follows:

Whether a PUCCH format of up to 2 bits or greater than 2 bits is used is determined by the UE implicitly based on the payload size.

Dynamic signaling in the DCI message is used to choose between certain PUCCH resource sets that are configured semi-statically. For example, the DCI message may be used to determine whether a PUCCH resource set in slot n+1 or slot n+2 is used and to determine whether the PUCCH resource set includes entries corresponding to short or long PUCCH. In this example, all the PUCCH resource sets therefore have entries only corresponding to a single PUCCH format.

The CCE index, the search space of the successfully received PDCCH, and optionally the identifier (RNTI) used to scramble the PDCCH is then used to determine a single PUCCH resource within the group of PUCCH resource sets corresponding to the chosen PUCCH format.

After initial access when an RRC configuration is not available, a set of default PUCCH resource sets from which a PUCCH resource set is chosen by the DCI signaling is specified. In addition, for each of these PUCCH resource sets, default mappings of PUCCH resources for each of the PDCCH candidates in the CORESET carrying the common search space where the remaining system information (RMSI) is received may be specified. To handle the case where RRC configuration information is ambiguous during RRC reconfigurations, a default mapping of PUCCH resource sets for each of the chosen values via DCI signaling and a mapping of PUCCH resources within each of these PUCCH resource sets for each of the PDCCH candidates in the CORESET is configured as part of the CORESET configuration.

It may be noted that for the considered example, in this embodiment, there are four PUCCH resource sets configured to a UE with each PUCCH resource set potentially having a large set of PUCCH resources with the number of PUCCH resources correlated to the number of PDCCH candidates available for scheduling PDCCH at the gNB. In contrast, in Embodiment 3, each resource set only has a maximum of four entries from which the 2 bits of DCI signaling choose a single PUCCH resource after implicit determination is used to choose a PUCCH resource set.

In variations of this embodiment, the DCI signaling may be used to choose between PUCCH resource sets in other ways including the following:

Starting indices of PUCCH resource sets. For instance, using the common PUCCH resource and PDCCH candidate numbering scheme in Embodiment 1, the DCI signaling may be used to choose between one of four configured starting indices for the set of PUCCH resources from which implicit determination is used to choose a PUCCH resource.

PUCCH resources in different PUCCHs in the same slot. For example, the DCI signaling could be used to choose between PUCCHs in different OFDM symbols or different PRBs.

Different frequency hopping configurations including no hopping. The DCI signaling could be used to choose whether frequency hopping should be used and if it is used where the location of the hop may be relative to the beginning of the PUCCH.

It should be clear to those skilled in the art that other partitions of the available resources can be executed with the DCI signaling to indicate which set should be used for PUCCH resource determination by other means such as the location of the received PDCCH.

Embodiment 5

In any of the above embodiments, the number of supported UEs can be much greater than the number of PUCCH resources available, with statistical multiplexing benefits allowing a larger number of UEs to be supported while keeping the probability of blocking and collisions to an acceptably low value. In this embodiment, UEs chosen to be configured to map to the same PUCCH resources or PUCCH resource sets have a lower probability of transmitting together. This could, for example, be because these UEs have very high data rate requirements so that they will likely not share resources with other UEs in the same slot.

Embodiment 6

In case the UE is configured with multiple downlink component carriers and/or bandwidth parts for which feedback transmissions compete for the same PUCCH resources, the indexing of CORESETs/PDCCH candidates is done across all configured downlink carriers and/or bandwidth parts. Instead of configured downlink carriers and/or bandwidth parts, it is possible to only consider activated downlink carriers and/or bandwidth parts. This embodiment can be used with the methods taught in any of the previous embodiments.

Another manner in case the UE is configured with multiple downlink component carriers and/or bandwidth parts is that the PUCCH resources are selected from the CORESETs/PDCCH located on the primary cell in case the primary cell is only scheduled and, if at least one secondary cell is scheduled, the PUCCH resources are selected from a different PUCCH resource set. For the second case, the PUCCH resource candidates can be selected based on the carrier with the smallest carrier index across all the scheduled secondary cells. Another way is that if the primary cell is included the resource candidates are purely selected from the primary cells' resource set.

This embodiment can be used with the methods taught in any of the previous embodiments.

Embodiment 7

In another embodiment, the resource candidates that are selected for PUCCH resources are based on PDCCH scheduled in the latest slot, latest scheduled PDCCH, or all scheduled PDCCHs.

For example, if a UE receives a PDCCH which points to a PUCCH resource using any one of the previous embodiments and the UE receives a PDCCH at a later time, this latest scheduled PDCCH can override the PUCCH resource assignment as per the previously received PDCCH, and the HARQ feedback can be sent for both the PDSCHs corresponding to the prior and latest PDCCH using the PUCCH resources determined based on the latest received PDCCH. In other words, a UE receives a first PDCCH scheduling a first PDSCH transmission and a second PDCCH scheduling a second PDSCH transmission. The second PDCCH is received later than the first PDCCH. If HARQ ACK feedback for both the first and second PDSCH transmissions is to be provided in the same PUCCH resource, then the UE determines the PUCCH resource based on the latest PDCCH, which in this example is the second PDCCH. The PUCCH resource can be determined based on the latest PDCCH using any of the embodiments described above.

Similarly, the PUCCH resources can be based on all the PDCCHs in the latest slot or on all the scheduled outstanding PDCCHs.

As a part of this embodiment, a field is included in the DCI message that indicates which of the above methods should be used for PUCCH resource determination.

This embodiment can be used with the methods taught in any of the previous embodiments.

Embodiment 8

In this embodiment, different UEs that are sharing a common pool of PUCCH resources are configured with CORESETs and indexing mechanisms for PDCCH messages and PUCCH resources in a consistent way so that any overlapped resources both for PDCCH and PUCCH have the same index for different UEs. As an example, consider two UEs that have two CORESETs each, with the first CORESET of the two UEs using the same physical resources, but the second CORESET of the two UEs using different resources. The first CORESETs for the two UEs may have X CCEs indexed from {0, 1, . . . , X−1}. The second CORESET of the first UE may have Y CCEs indexed as {X, X+1, . . . , X+Y−1} while the second CORESET of the second UE may have Z CCEs indexed as {Y, Y+1, . . . , X+Y+Z−1}. Thus, the PUCCH resources for different UEs can be mapped to the indexed CCEs so that any conflicts between the two UEs for PUCCH resources are avoided as long as they received PDCCHs starting in different CCE indices even though the CORESET configurations are not the same.

As a part of this embodiment, the CORESET configuration therefore includes a starting CCE index to be used by a UE for the CCEs in each CORESET.

This embodiment can be used with the methods taught in any of the previous embodiments.

Certain of the above-described embodiments may use multiple slot mapping or single slot mapping, depending on the scheme. As an example, for the scheme of example Embodiment 1, if the PDSCH assignments for multiple slots are acknowledged in PUCCH resources in the same slot, then PDCCHs should be indexed in a consistent way. As another example, the special case in example Embodiment 2 (which uses CORESET or slot based partitioning of PUCCH resources) can be used to do things purely on a slot basis.

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160b, and Wireless Devices (WDs) 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and WD 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), LTE, and/or other suitable Second, Third, Fourth, or Fifth Generation (2G, 3G, 4G, or 5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

Network 106 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio access points), Base Stations (BSs) (e.g., radio base stations, Node Bs, evolved Node Bs (eNBs) and NR Node Bs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or Base Station Controllers (BSCs), Base Transceiver Stations (BTSs), transmission points, transmission nodes, Multi-Cell/Multicast Coordination Entities (MCEs), core network nodes (e.g., Mobile Switching Centers (MSCs), Mobility Management Entities (MMEs)), Operation and Maintenance (O&M) nodes, Operations Support System (OSS) nodes, Self Optimized Network (SON) nodes, positioning nodes (e.g., Evolved-Serving Mobile Location Centers (E-SMLCs), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple Random Access Memory (RAM) modules).

Similarly, network node 160 may be composed of multiple physically separate components (e.g., a Node B component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, network node 160 may be configured to support multiple Radio Access Technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, Wideband Code Division Multiple Access (WCDMA), LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a System on a Chip (SOC).

In some embodiments, processing circuitry 170 may include one or more of Radio Frequency (RF) transceiver circuitry 172 and baseband processing circuitry 174. In some embodiments, RF transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB, or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, RAM, Read Only Memory (ROM), mass storage media (for example, a hard disk), removable storage media (for example, a flash drive, a Compact Disk (CD), or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192; instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data, and/or signals may be received from a wireless device, another network node, and/or any other network equipment. Similarly, antenna 162, interface 190, and/or processing circuitry 170 may be configured to perform any transmitting operations described herein as being performed by a network node. Any information, data, and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, WD refers to a device capable, configured, arranged, and/or operable to communicate wirelessly with network nodes and/or other wireless devices. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless cameras, a gaming console or device, a music storage device, a playback appliance, a wearable terminal device, a wireless endpoint, a mobile station, a tablet, a laptop, a Laptop Embedded Equipment (LEE), a Laptop Mounted Equipment (LME), a smart device, a wireless Customer Premise Equipment (CPE), a vehicle-mounted wireless terminal device, etc. A WD may support Device-to-Device (D2D) communication, for example by implementing a Third Generation Partnership Project (3GPP) standard for sidelink communication, Vehicle-to-Vehicle (V2V), Vehicle-to-Infrastructure (V2I), Vehicle-to-Everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine Type Communication (MTC) device. As one particular example, the WD may be a UE implementing the 3GPP Narrowband IoT (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136, and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data, and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, Central Processing Unit (CPU), Digital Signal Processor (DSP), Application Specific Integrated Circuit (ASIC), Field Programmable Gate Array (FPGA), or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium.

In alternative embodiments, some or all of the functionality may be provided by processing circuitry 120 without executing instructions stored on a separate or discrete device readable storage medium, such as in a hard-wired manner In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a Universal Serial Bus (USB) port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications, etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 2:
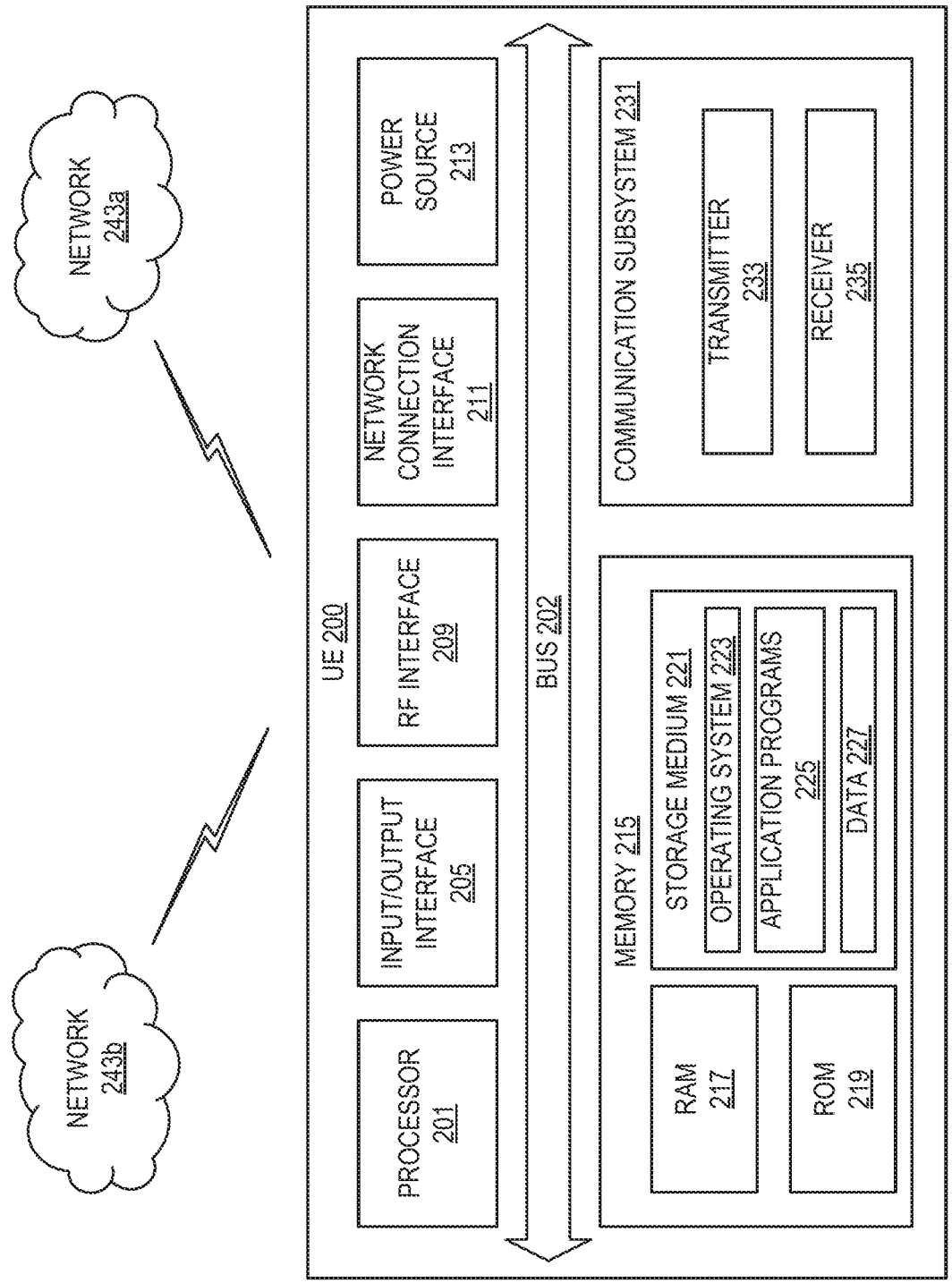
FIG. 2 illustrates one embodiment of a User Equipment (UE) in accordance with various aspects described herein.

FIG. 2 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3GPP, including a NB-IoT UE, a MTC UE, and/or an enhanced MTC (eMTC) UE. UE 200, as illustrated in FIG. 2, is one example of a WD configured for communication in accordance with one or more communication standards promulgated by the 3GPP, such as 3GPP's GSM, UMTS, LTE, and/or 5G standards. As mentioned previously, the terms WD and UE may be used interchangeably. Accordingly, although FIG. 2 is a UE, the components discussed herein are equally applicable to a WD, and vice-versa.

In FIG. 2, UE 200 includes processing circuitry 201 that is operatively coupled to input/output interface 205, RF interface 209, network connection interface 211, memory 215 including RAM 217, ROM 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 2, or only a subset of the components. The level of integration between the components may vary from one UE to another UE. Further, certain UEs may contain multiple instances of a component, such as multiple processors, memories, transceivers, transmitters, receivers, etc.

In FIG. 2, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or DSP, together with appropriate software; or any combination of the above. For example, the processing circuitry 201 may include two CPUs. Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 2, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a LAN, a WAN, a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as Redundant Array of Independent Disks (RAID), floppy disk drive, flash memory, USB flash drive, external hard disk drive, thumb drive, pen drive, key drive, High-Density Digital Versatile Disc (HD-DVD) optical disc drive, internal hard disk drive, Blu-Ray optical disc drive, Holographic Digital Data Storage (HDDS) optical disc drive, external mini Dual In-Line Memory Module (DIMM), synchronous dynamic RAM (SDRAM), external micro-DIMM SDRAM, smartcard memory such as a Subscriber Identity Module (SIM) or a Removable User Identity Module (RUIM), other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 2, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a Radio Access Network (RAN) according to one or more communication protocols, such as IEEE 802.2, Code Division Multiplexing Access (CDMA), WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the Global Positioning System (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a LAN, a WAN, a computer network, a wireless network, a telecommunications network, another like network or any combination thereof. For example, network 243b may be a cellular network, a Wi-Fi network, and/or a near-field network. Power source 213 may be configured to provide Alternating Current (AC) or Direct Current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 3:
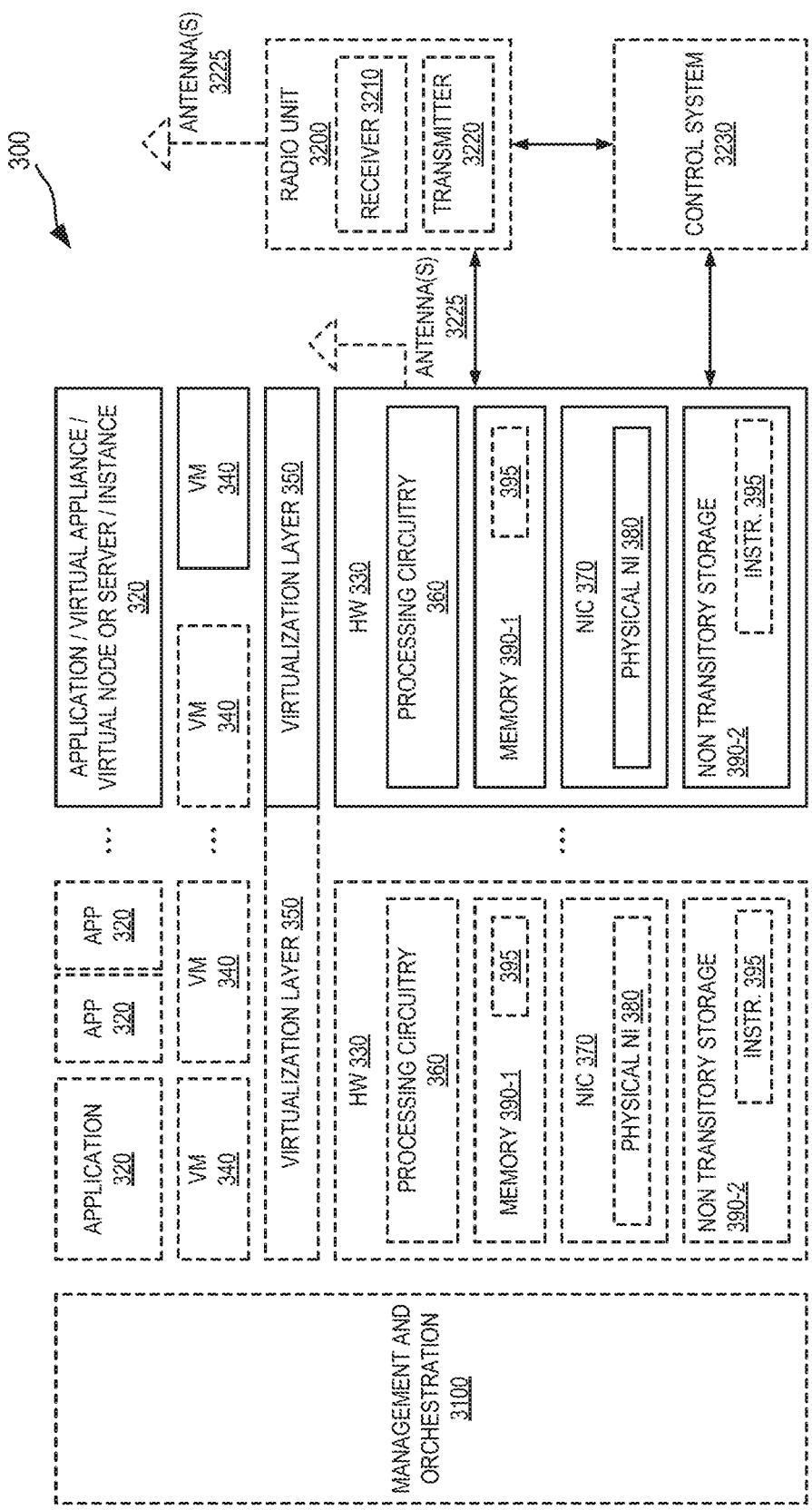
FIG. 3 a schematic block diagram illustrating a virtualization environment in which functions implemented by some embodiments disclosed herein may be virtualized.

FIG. 3 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be Commercial Off-The-Shelf (COTS) processors, dedicated ASICs, or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more Network Interface Controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a Virtual Machine Monitor (VMM). Virtualization layer 350 may present a virtual operating platform that appears like networking hardware to virtual machine 340.

As shown in FIG. 3, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or CPE) where many hardware nodes work together and are managed via Management and Orchestration (MANO) 3100, which, among others, oversees lifecycle management of applications 320.

Virtualization of the hardware is in some contexts referred to as Network Function Virtualization (NFV). NFV may be used to consolidate many network equipment types onto industry standard high volume server hardware, physical switches, and physical storage, which can be located in data centers, and CPE.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate Virtual Network Elements (VNE).

Still in the context of NFV, Virtual Network Function (VNF) is responsible for handling specific network functions that run in one or more virtual machines 340 on top of hardware networking infrastructure 330 and corresponds to application 320 in FIG. 3.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 4:
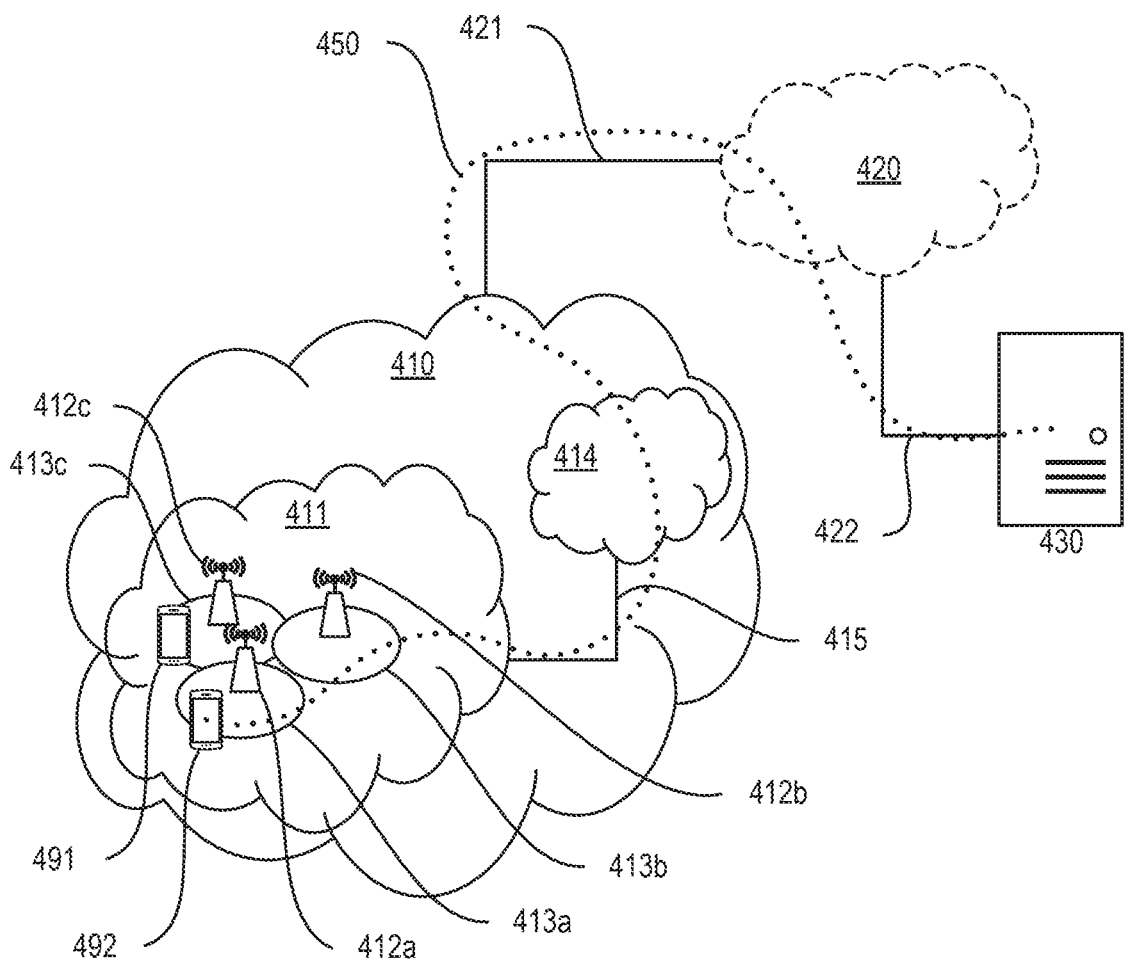
FIG. 4 illustrates a telecommunication network connected via an intermediate network to a host computer in accordance with some embodiments of the present disclosure.

With reference to FIG. 4, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as Node Bs, eNBs, gNBs, or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 4 as a whole enables connectivity between the connected UEs 491, 492 and host computer 430. The connectivity may be described as an Over-the-Top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 5. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 5) served by base station 520. Communication interface 526 may be configured to facilitate connection 560 to host computer 510. Connection 560 may be direct or it may pass through a core network (not shown in FIG. 5) of the telecommunication system and/or through one or more intermediate networks outside the telecommunication system. In the embodiment shown, hardware 525 of base station 520 further includes processing circuitry 528, which may comprise one or more programmable processors, ASICs, FPGAs, or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, ASICs, FPGAs, or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 5:
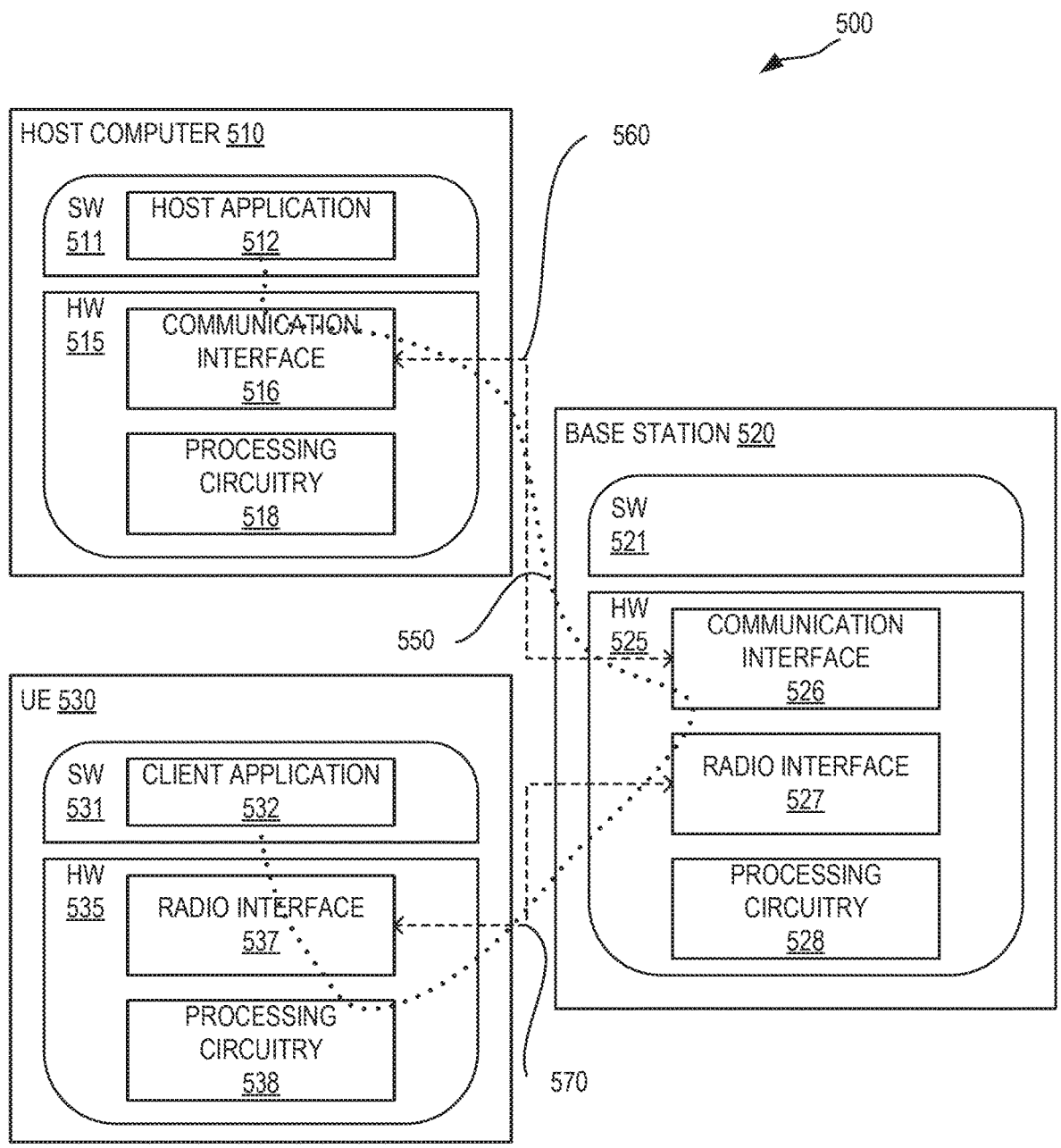
FIG. 5 is a generalized block diagram of a host computer communicating via a base station with a UE over a partially wireless connection in accordance with some embodiments of the present disclosure.

It is noted that host computer 510, base station 520 and UE 530 illustrated in FIG. 5 may be similar or identical to host computer 430, one of base stations 412a, 412b, 412c and one of UEs 491, 492 of FIG. 4, respectively. This is to say, the inner workings of these entities may be as shown in FIG. 5 and independently, the surrounding network topology may be that of FIG. 4.

In FIG. 5, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the power consumption (e.g., by reducing overhead messaging required for PUCCH resource allocation) and thereby provide benefits such as extended battery lifetime. As another example, the teachings of these embodiments may reduce collisions between PUCCH resources used by different wireless devices, which may allow for reduced latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 6, 7:
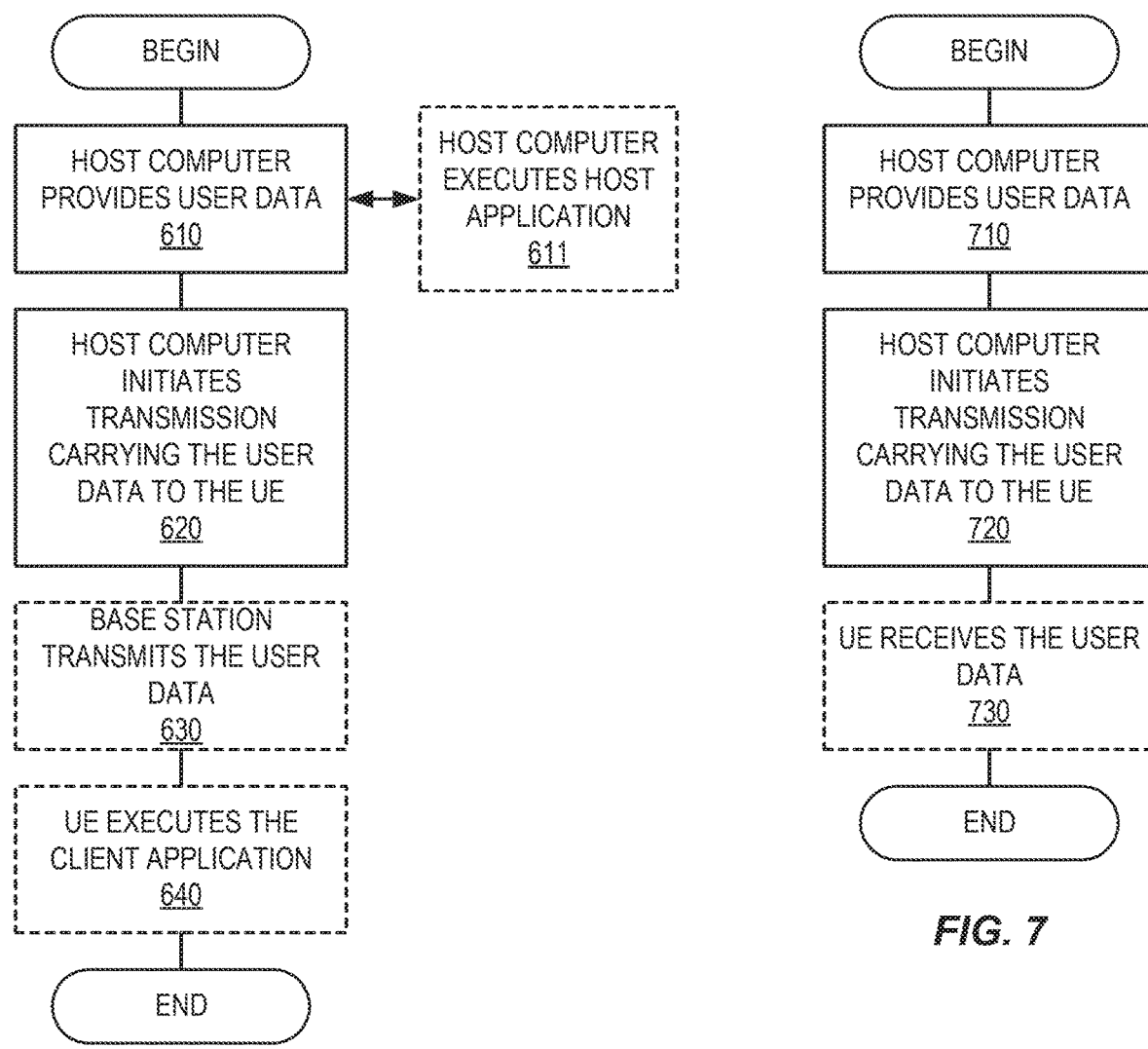
FIG. 6 is a flowchart illustrating a method implemented in a communication system in accordance with one embodiment of the present disclosure.
FIG. 7 is a flowchart illustrating a method implemented in a communication system in accordance with one embodiment of the present disclosure.

FIG. 6 is a flowchart illustrating a method implemented in a communication system, in accordance with one embodiment. The communication system includes a host computer, a base station, and a UE which may be those described with reference to FIGS. 4 and 5. For simplicity of the present disclosure, only drawing references to FIG. 6 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 7 is a flowchart illustrating a method implemented in a communication system, in accordance with one embodiment. The communication system includes a host computer, a base station, and a UE which may be those described with reference to FIGS. 4 and 5. For simplicity of the present disclosure, only drawing references to FIG. 7 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 8, 9:
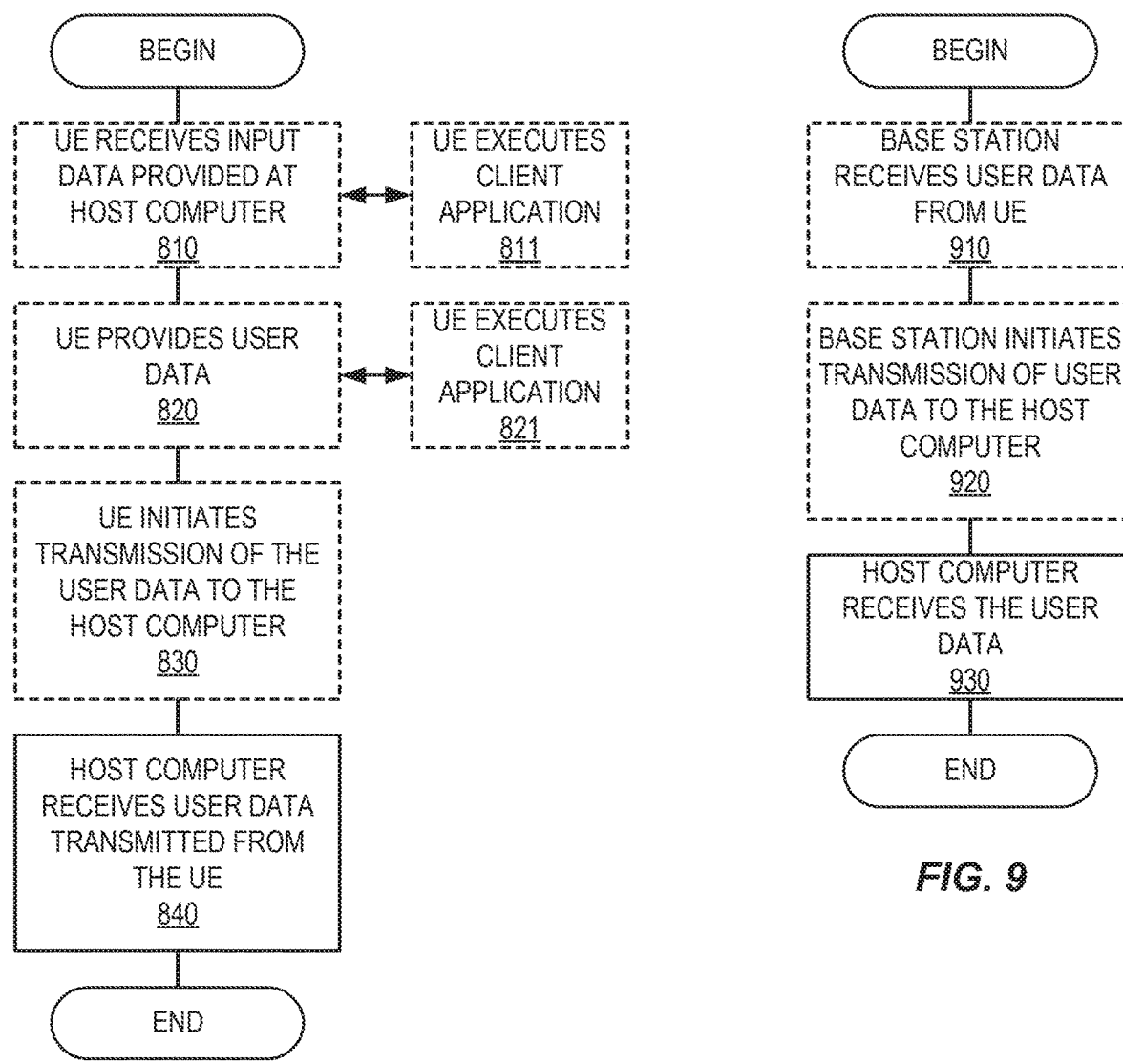
FIG. 8 is a flowchart illustrating a method implemented in a communication system in accordance with one embodiment on the present disclosure.
FIG. 9 is a flowchart illustrating a method implemented in a communication system in accordance with one embodiment of the present disclosure.

FIG. 8 is a flowchart illustrating a method implemented in a communication system, in accordance with one embodiment. The communication system includes a host computer, a base station, and a UE which may be those described with reference to FIGS. 4 and 5. For simplicity of the present disclosure, only drawing references to FIG. 8 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 9 is a flowchart illustrating a method implemented in a communication system, in accordance with one embodiment. The communication system includes a host computer, a base station, and a UE which may be those described with reference to FIGS. 4 and 5. For simplicity of the present disclosure, only drawing references to FIG. 9 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 10:
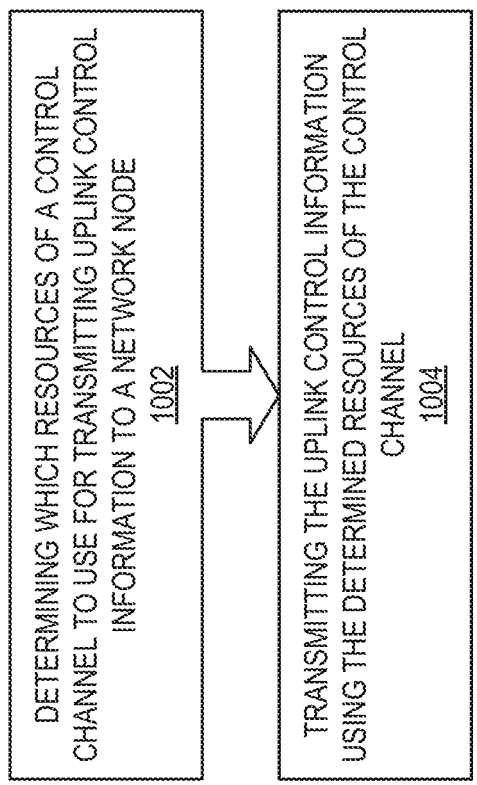
FIG. 10 is a flow chart that illustrates the operation of a UE in accordance with at least some aspects of the embodiments disclosed herein.

FIG. 10 depicts a method in a wireless device. In accordance with particular embodiments, the method begins at step 1002 with determining which resources of a control channel (e.g., PUCCH) to use for transmitting uplink control information (e.g., HARQ ACK) to a network node. The determination may be based on any suitable information, for example, such as described with respect to example embodiments 1-8 above. In certain embodiments, the control channel resources to be used for transmitting the uplink control information are determined based on signaling received from the network node (e.g., RRC and/or DCI signaling) and implicit resource determination performed by the wireless device. The method proceeds to step 1004 with transmitting the uplink control information using the determined resources of the control channel (the resources determined in step 1002).

Figure 11:
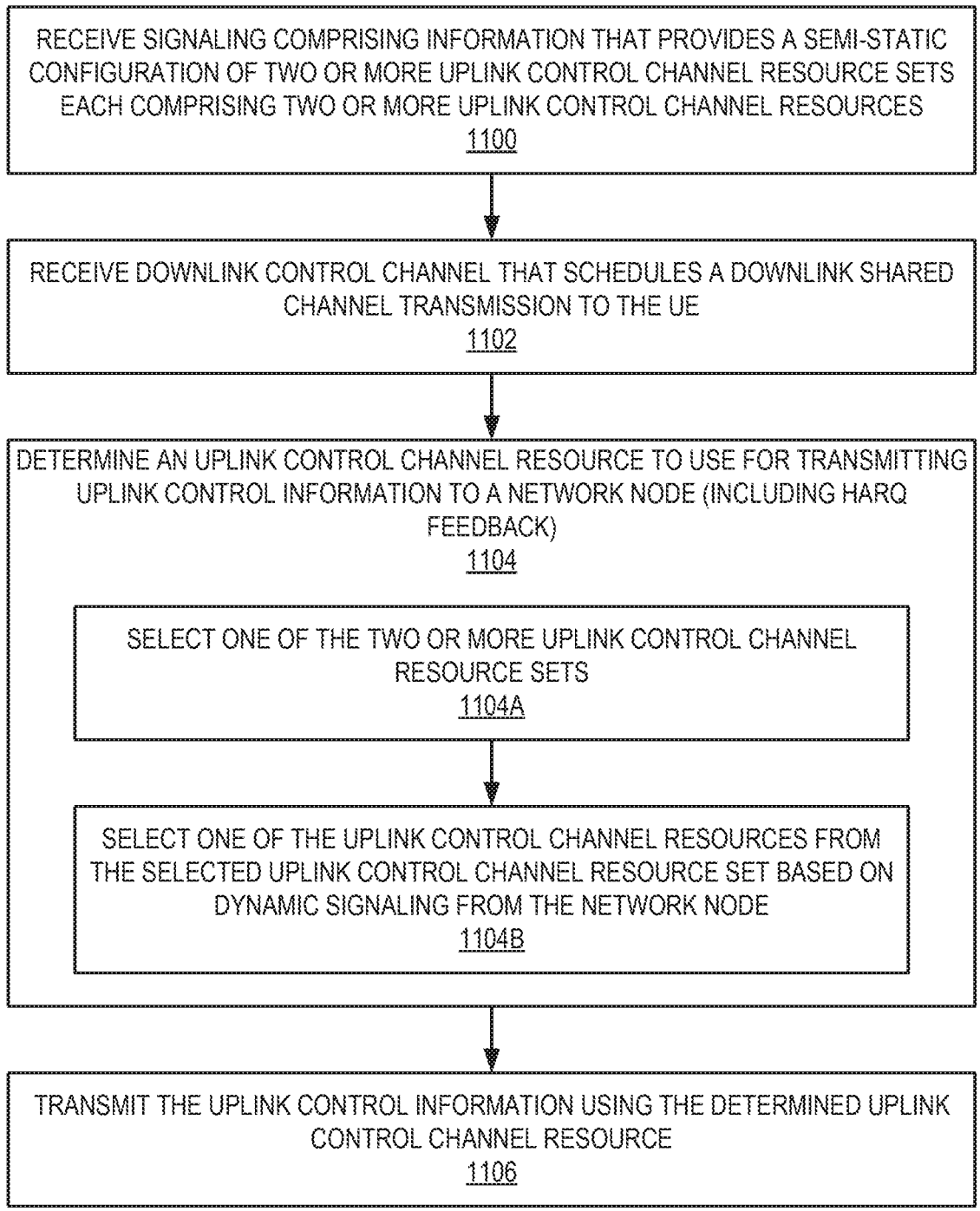
FIG. 11 is a flow chart that illustrates at least some aspects of one embodiment of the present disclosure.
Figure 12:
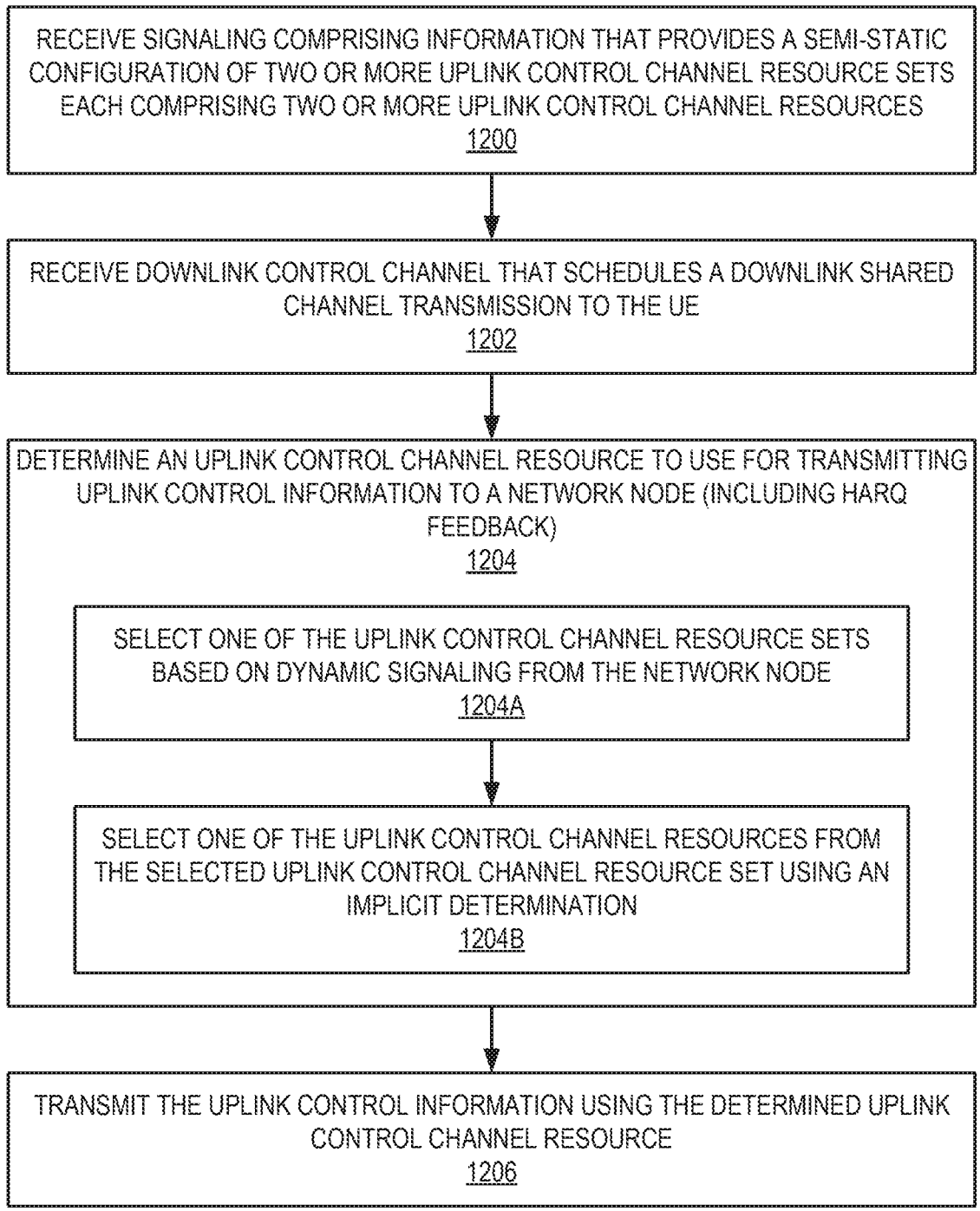
FIG. 12 is a flow chart that illustrates at least some aspects of one embodiment of the present disclosure.
Figure 13:
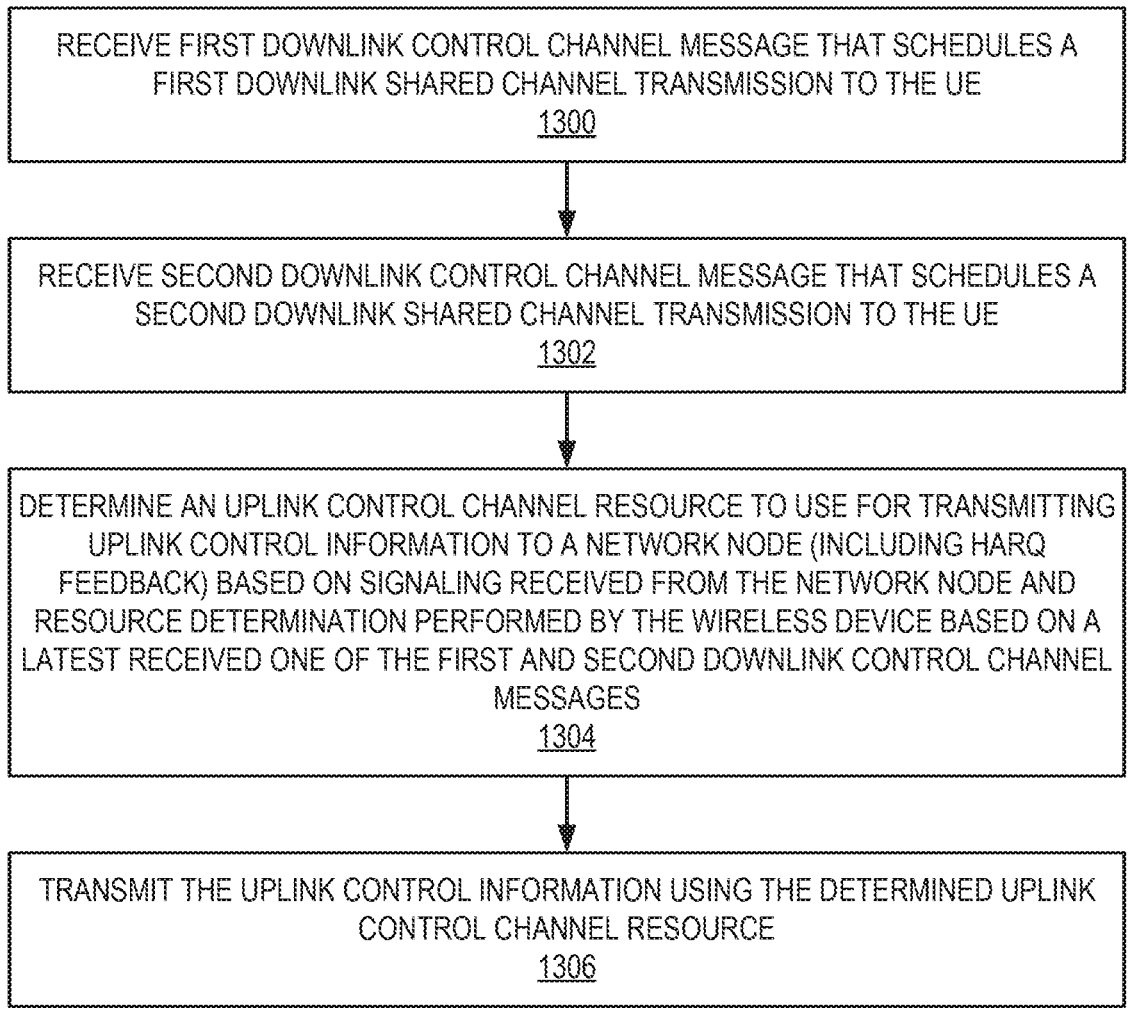
FIG. 13 is a flow chart that illustrates at least some aspects of one embodiment of the present disclosure.

While FIG. 10 illustrates the general operation of a wireless device (e.g., a UE), FIGS. 11 through 13 show some specific examples with respect to Embodiments 3, 4, and 7 described above. FIG. 11 is a flow chart that illustrates at least some aspects of Embodiment 3 described above. As illustrated, the UE receives, from the network node, signaling comprising information that provides a semi-static configuration of two or more uplink control channel resource sets each comprising two or more uplink control channel resources (step 1100). The UE receives a downlink control channel that schedules a downlink shared channel transmission to the UE (step 1102). The UE determines an uplink control channel resource to use for transmitting UCI to a network node (step 1104). The details of the determining step 1104 are as described above with respect to Embodiment 3. As discussed above, the UCI comprises HARQ feedback for the downlink shared channel transmission. As discussed above, determining the uplink control channel resource comprises selecting the uplink control channel resource from uplink control channel resources in two or more uplink control channel resource sets based on the UCI payload and one or more of the following when HARQ ACK feedback is part of the UCI:
- the CORESET where the downlink control channel scheduling the physical downlink shared channel transmission (i.e., the physical downlink shared channel transmission for which HARQ ACK feedback is to be provided) is received;
- the search space within the above CORESET (i.e., the search space within the above CORESET in which the downlink control channel scheduling the physical downlink shared channel transmission is received);
- the starting CCE index of the downlink control channel candidate within the above search space (i.e., the starting CCE index of the downlink control channel candidate within the above search space in which the downlink control channel scheduling the physical downlink shared channel transmission is received).

More specifically, in Embodiment 3, the UE selects one of the two or more uplink control channel resource sets (step 1104A). As described above, this selection is based on the UCI payload and one or more of the following when HARQ ACK feedback is part of the UCI:
- the CORESET where the downlink control channel scheduling the physical downlink shared channel transmission (i.e., the physical downlink shared channel transmission for which HARQ ACK feedback is to be provided) is received;
- the search space within the above CORESET (i.e., the search space within the above CORESET in which the downlink control channel scheduling the physical downlink shared channel transmission is received);
- the starting CCE index of the downlink control channel candidate within the above search space (i.e., the starting CCE index of the downlink control channel candidate within the above search space in which the downlink control channel scheduling the physical downlink shared channel transmission is received).

In some embodiments, the selection of the uplink control channel resource set is based on the CCE index, the search space of the successfully received PDCCH, and optionally the identifier (Radio Network Temporary Identifier (RNTI)) used to scramble the PDCCH is then used to determine a single PUCCH resource set within the group of configured PUCCH resource sets corresponding to the chosen PUCCH format. The UE selects, as the uplink control channel resource to use for transmitting the uplink control information to the network node, one of the two or more uplink control channel resources from the selected uplink control channel resource set based on dynamic signaling from the network node (step 1104B). The UE transmits the UCI using the determined uplink control channel resource (step 1106).

FIG. 12 is a flow chart that illustrates at least some aspects of Embodiment 4 described above. As illustrated, the UE receives, from the network node, signaling comprising information that provides a semi-static configuration of two or more uplink control channel resource sets each comprising two or more uplink control channel resources (step 1200). The UE receives a downlink control channel that schedules a downlink shared channel transmission to the UE (step 1202). The UE determines an uplink control channel resource to use for transmitting UCI to a network node (step 1204). The details of the determining step 1204 are as described above with respect to Embodiment 4. As discussed above, the UCI comprises HARQ feedback for the downlink shared channel transmission. As discussed above, determining the uplink control channel resource comprises selecting the uplink control channel resource from uplink control channel resources in two or more uplink control channel resource sets based on the UCI payload and one or more of the following when HARQ ACK feedback is part of the UCI:
- the CORESET where the downlink control channel scheduling the physical downlink shared channel transmission (i.e., the physical downlink shared channel transmission for which HARQ ACK feedback is to be provided) is received;
- the search space within the above CORESET (i.e., the search space within the above CORESET in which the downlink control channel scheduling the physical downlink shared channel transmission is received);

the starting CCE index of the downlink control channel candidate within the above search space (i.e., the starting CCE index of the downlink control channel candidate within the above search space in which the downlink control channel scheduling the physical downlink shared channel transmission is received).

More specifically, in Embodiment 4, the UE selects one of the uplink control channel resource sets based on dynamic signaling from the network node (step 1204A). The UE selects, as the uplink control channel resource to use for transmitting the uplink control information to the network node, one of the uplink control channel resources from the selected uplink control channel resource set using an implicit determination (step 1204B). As described above, this implicit determination is based on the CCE index, the search space of the successfully received PDCCH, and optionally the identifier (RNTI) used to scramble the PDCCH is then used to determine a single PUCCH resource within the group of PUCCH resource sets corresponding to the chosen PUCCH format. The UE transmits the UCI using the determined uplink control channel resource (step 1206).

FIG. 13 is a flow chart that illustrates at least some aspects of Embodiment 7 described above. As illustrated, the UE receives, from the network node, a first downlink control channel message that schedules a first downlink shared channel transmission to the UE (step 1300) and a second downlink control channel message that schedules a second downlink shared channel transmission to the UE (step 1302) The UE determines an uplink control channel resource to use for transmitting UCI to a network node (step 1304). The details of the determining step 1304 are as described above with respect to Embodiment 7. As discussed above, the UCI comprises HARQ feedback for the downlink shared channel transmission. As discussed above, the uplink channel resource to use for transmitting the UCI is determined based on signaling received from the network node and a latest received one of the first and second downlink control channel messages. The UE transmits the UCI using the determined uplink control channel resource (step 1306).

Figure 14:
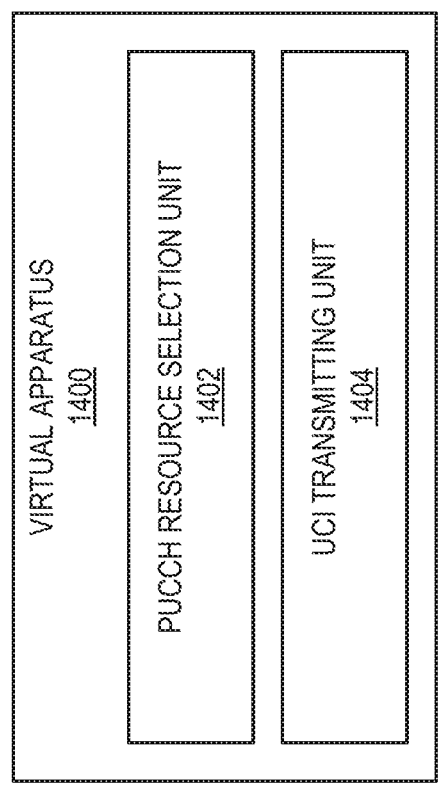
FIG. 14 illustrates a schematic block diagram of an apparatus in a wireless network (for example, the wireless network shown in FIG. 1).

FIG. 14 illustrates a schematic block diagram of an apparatus 1400 in a wireless network (for example, the wireless network shown in FIG. 1). The apparatus may be implemented in a wireless device or network node (e.g., wireless device 110 or network node 160 shown in FIG. 1). Apparatus 1400 is operable to carry out the example method described with reference to FIG. 10 and possibly any other processes or methods disclosed herein. It is also to be understood that the method of FIG. 10 is not necessarily carried out solely by apparatus 1400. At least some operations of the method can be performed by one or more other entities.

Virtual apparatus 1400 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause PUCCH resource selection unit 1402, UCI transmitting unit 1404, and any other suitable units of apparatus 1400 to perform corresponding functions according one or more embodiments of the present disclosure.

As illustrated in FIG. 14, apparatus 1400 includes PUCCH resource selection unit 1402 and UCI transmitting unit 1404. PUCCH resource selection unit 1402 is configured to determine which resources of a control channel to use for transmitting uplink control information to a network node. The determination may be based on any suitable information, for example, such as described with respect to example embodiments 1-8 above. UCI transmitting unit 1404 is configured to transmit the uplink control information using the resources determined by PUCCH resource selection unit 1402.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some example embodiments are:

Group A Embodiments

Embodiment 1

A method performed by a wireless device, the method comprising: determining which resources of a control channel to use for transmitting uplink control information to a network node, the resources determined based on a combination of signaling received from the network node and implicit resource determination performed by the wireless device; and transmitting the uplink control information using the determined resources of the control channel.

Embodiment 2

The method of the previous embodiment, wherein the control channel comprises a Physical Uplink Control Channel (PUCCH) and wherein the uplink control information comprises one or more of Hybrid Automatic Repeat Request (HARQ) Acknowledgements (ACKs), Channel State Information (CSI), and/or Scheduling Requests (SRs).

Embodiment 3

The method of any of the previous embodiments, wherein the determining which resources of the control channel to use is performed when the timing is variable between when the wireless device receives a message scheduling a downlink transmission and when the wireless device transmits the uplink control information.

Embodiment 4

The method of any of the previous embodiments, wherein the determining which resources of the control channel to use is performed when the wireless device can receive a message scheduling a downlink transmission in any one of multiple control regions in the same slot.

Embodiment 5

The method of any of the previous embodiments, wherein the signaling received from the network node for determining which resources of the control channel to use comprises semi-static signaling.

Embodiment 6

The method of the previous embodiment, wherein the semi-static signaling comprises Radio Resource Control (RRC) signaling.

Embodiment 7

The method of any of the previous embodiments, wherein the signaling received from the network node for determining which resources of the control channel to use comprises dynamic signaling.

Embodiment 8

The method of the previous embodiment, wherein the dynamic signaling comprises Downlink Control Information (DCI).

Embodiment 9

The method of any of the previous embodiments, wherein the signaling received from the network node comprises RRC signaling that configures different sets of PUCCH resources for different CORESETs in one or more slots from which the implicit resource determination can be used to determine a PUCCH resource so that the resources in different sets are orthogonal to each other.

Embodiment 10

The method of any of the previous embodiments, wherein the signaling received from the network node comprises dynamic signaling that indicates a starting index relative to which PUCCH resources can be implicitly determined.

Embodiment 11

The method of any of the previous embodiments, wherein the signaling received from the network node comprises dynamic signaling that indicates the slot index and/or PUCCH format to use.

Embodiment 12

The method of any of the previous embodiments, wherein the uplink control information comprises periodic uplink control information.

Embodiment 13

The method of any of the previous embodiments, wherein the uplink control information comprises aperiodic uplink control information.

Embodiment 14

The method of any of the previous embodiments, further comprising: providing user data; and forwarding the user data to a host computer via the transmission to the base station.

Group B Embodiments

Embodiment 15

A method performed by a base station, the method comprising: signaling information to a wireless device, wherein the information, when combined with implicit resource determination performed by the wireless device, assists the wireless device in determining which resources of a control channel to use for transmitting uplink control information to the base station.

Embodiment 16

The method of the previous embodiment, further comprising receiving the uplink control information from the wireless device via the resources of the control channel determined in part based on the signaling information.

Embodiment 17

The method of any of the previous embodiments, further comprising determining the information to signal to the wireless device.

Embodiment 18

The method of any of the previous embodiments, wherein the control channel comprises a Physical Uplink Control Channel (PUCCH) and wherein the uplink control information comprises one or more of Hybrid Automatic Repeat Request (HARQ) Acknowledgements (ACKs), Channel State Information (CSI), and/or Scheduling Requests (SRs).

Embodiment 19

The method of any of the previous embodiments, further comprising determining to signal the information to the wireless device if the timing is variable between when the base station sends a message scheduling a downlink transmission and when the wireless device transmits the uplink control information.

Embodiment 20

The method of any of the previous embodiments, further comprising determining to signal the information to the wireless device if the base station can send a message scheduling a downlink transmission in any one of multiple control regions in the same slot.

Embodiment 21

The method of any of the previous embodiments, wherein the signaling sent to the wireless device for determining which resources of the control channel to use comprises semi-static signaling.

Embodiment 22

The method of any of the previous embodiments, wherein the signaling sent to the wireless device for determining which resources of the control channel to use comprises dynamic signaling.

Embodiment 23

The method of any of the previous embodiments, wherein the signaling sent to the wireless device comprises Radio Resource Control (RRC) signaling that configures different sets of Physical Uplink Control Channel (PUCCH) resources for different CORESETs in one or more slots from which the implicit resource determination can be used by the wireless device to determine a PUCCH resource so that the resources in different sets are orthogonal to each other.

Embodiment 24

The method of any of the previous embodiments, wherein the signaling sent to the wireless device comprises dynamic signaling that indicates a starting index relative to which PUCCH resources can be implicitly determined.

Embodiment 25

The method of any of the previous embodiments, wherein the signaling sent to the wireless device comprises dynamic signaling that indicates the slot index and/or PUCCH format to use.

Embodiment 26

The method of any of the previous embodiments, wherein the uplink control information comprises periodic uplink control information.

Embodiment 27

The method of any of the previous embodiments, wherein the uplink control information comprises aperiodic uplink control information.

Embodiment 28

The method of any of the previous embodiments, further comprising: obtaining user data; and forwarding the user data to a host computer or a wireless device.

Group C Embodiments

Embodiment 29

A wireless device, the wireless device comprising: processing circuitry configured to perform any of the steps of any of the Group A embodiments; and power supply circuitry configured to supply power to the wireless device.

Embodiment 30

A base station, the base station comprising: processing circuitry configured to perform any of the steps of any of the Group B embodiments; and power supply circuitry configured to supply power to the base station.

Embodiment 31

A User Equipment (UE), the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 32

A communication system including a host computer comprising: processing circuitry configured to provide user data; and a communication interface configured to forward the user data to a cellular network for transmission to a User Equipment (UE), wherein the cellular network comprises a base station having a radio interface and processing circuitry, the base station's processing circuitry configured to perform any of the steps of any of the Group B embodiments.

Embodiment 33

The communication system of the previous embodiment further including the base station.

Embodiment 34

The communication system of the previous 2 embodiments, further including the UE, wherein the UE is configured to communicate with the base station.

Embodiment 35

The communication system of the previous 3 embodiments, wherein: the processing circuitry of the host computer is configured to execute a host application, thereby providing the user data; and the UE comprises processing circuitry configured to execute a client application associated with the host application.

Embodiment 36

A method implemented in a communication system including a host computer, a base station, and a User Equipment (UE), the method comprising: at the host computer, providing user data; and at the host computer, initiating a transmission carrying the user data to the UE via a cellular network comprising the base station, wherein the base station performs any of the steps of any of the Group B embodiments.

Embodiment 37

The method of the previous embodiment, further comprising, at the base station, transmitting the user data.

Embodiment 38

The method of the previous 2 embodiments, wherein the user data is provided at the host computer by executing a host application, the method further comprising, at the UE, executing a client application associated with the host application.

Embodiment 39

A User Equipment (UE) configured to communicate with a base station, the UE comprising a radio interface and processing circuitry configured to performs the method of the previous 3 embodiments.

Embodiment 40

A communication system including a host computer comprising: processing circuitry configured to provide user data;

and a communication interface configured to forward user data to a cellular network for transmission to a User Equipment (UE), wherein the UE comprises a radio interface and processing circuitry, the UE's components configured to perform any of the steps of any of the Group A embodiments.

Embodiment 41

The communication system of the previous embodiment, wherein the cellular network further includes a base station configured to communicate with the UE.

Embodiment 42

The communication system of the previous 2 embodiments, wherein: the processing circuitry of the host computer is configured to execute a host application, thereby providing the user data; and the UE's processing circuitry is configured to execute a client application associated with the host application. Embodiment 43: A method implemented in a communication system including a host computer, a base station, and a User Equipment (UE), the method comprising: at the host computer, providing user data; and at the host computer, initiating a transmission carrying the user data to the UE via a cellular network comprising the base station, wherein the UE performs any of the steps of any of the Group A embodiments.

Embodiment 44

The method of the previous embodiment, further comprising at the UE, receiving the user data from the base station.

Embodiment 45

A communication system including a host computer comprising: a communication interface configured to receive user data originating from a transmission from a User Equipment (UE) to a base station, wherein the UE comprises a radio interface and processing circuitry, the UE's processing circuitry configured to perform any of the steps of any of the Group A embodiments.

Embodiment 46

The communication system of the previous embodiment, further including the UE.

Embodiment 47

The communication system of the previous 2 embodiments, further including the base station, wherein the base station comprises a radio interface configured to communicate with the UE and a communication interface configured to forward to the host computer the user data carried by a transmission from the UE to the base station.

Embodiment 48

The communication system of the previous 3 embodiments, wherein: the processing circuitry of the host computer is configured to execute a host application; and the UE's processing circuitry is configured to execute a client application associated with the host application, thereby providing the user data.

Embodiment 49

The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 50

A method implemented in a communication system including a host computer, a base station, and a User Equipment (UE), the method comprising: at the host computer, receiving user data transmitted to the base station from the UE, wherein the UE performs any of the steps of any of the Group A embodiments.

Embodiment 51

The method of the previous embodiment, further comprising, at the UE, providing the user data to the base station.

Embodiment 52

The method of the previous 2 embodiments, further comprising: at the UE, executing a client application, thereby providing the user data to be transmitted; and at the host computer, executing a host application associated with the client application.

Embodiment 53

The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Embodiment 54

A communication system including a host computer comprising a communication interface configured to receive user data originating from a transmission from a User Equipment (UE) to a base station, wherein the base station comprises a radio interface and processing circuitry, the base station's processing circuitry configured to perform any of the steps of any of the Group B embodiments.

Embodiment 55

The communication system of the previous embodiment further including the base station.

Embodiment 56

The communication system of the previous 2 embodiments, further including the UE, wherein the UE is configured to communicate with the base station.

Embodiment 57

The communication system of the previous 3 embodiments, wherein: the processing circuitry of the host computer is configured to execute a host application; and the UE is configured to execute a client application associated with the host application, thereby providing the user data to be received by the host computer.

Embodiment 58

A method implemented in a communication system including a host computer, a base station, and a User Equipment (UE), the method comprising: at the host computer, receiving, from the base station, user data originating from a transmission which the base station has received from the UE, wherein the UE performs any of the steps of any of the Group A embodiments.

Embodiment 59

The method of the previous embodiment, further comprising at the base station, receiving the user data from the UE.

Embodiment 60

The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
AC Alternating Current
ACK Acknowledgement
AP Access Point
ASIC Application Specific Integrated Circuit
ATM Asynchronous Transfer Mode
BS Base Station
BSC Base Station Controller
BTS Base Transceiver Station
CBG Code Block Group
CCE Control Channel Element
CD Compact Disk
CDMA Code Division Multiplexing Access
COTS Commercial Off-The-Shelf
CPE Customer Premise Equipment
CPU Central Processing Unit
CSI Channel State Information
D2D Device-to-Device
DAS Distributed Antenna System
DC Direct Current
DCI Downlink Control Information
DIMM Dual In-Line Memory Module
DSP Digital Signal Processor
DVD Digital Video Disk
E-SMLC Evolved-Serving Mobile Location Centre
EEPROM Electrically Erasable Programmable Read Only Memory
eMTC Enhanced Machine Type Communication
eNB Evolved Node B
EPROM Erasable Programmable Read Only Memory
FPGA Field Programmable Gate Array
GHz Gigahertz
gNB Base station in New Radio
GPS Global Positioning System
GSM Global System for Mobile Communications
HARQ Hybrid Automatic Repeat Request
HDDS Holographic Digital Data Storage
HD-DVD High-Density Digital Versatile Disc
I/O Input and Output
IoT Internet of Things
IP Internet Protocol
LAN Local Area Network
LEE Laptop Embedded Equipment
LME Laptop Mounted Equipment
LTE Long Term Evolution
M2M Machine-to-Machine
MANO Management and Orchestration
MCE Multi-Cell/Multicast Coordination Entity
MDT Minimization of Drive Tests
MIMO Multiple Input Multiple Output
MME Mobility Management Entity
MSC Mobile Switching Center
MSR Multi-Standard Radio
MTC Machine Type Communication
NB-IoT Narrowband Internet of Things
NFV Network Function Virtualization
NIC Network Interface Controller
NR New Radio
O&M Operation and Maintenance
OCC Orthogonal Cover Code
OFDM Orthogonal Frequency Division Multiplexing
OSS Operations Support System
OTT Over-the-Top
PDA Personal Digital Assistant
PDCCH Physical Downlink Control Channel
PDSCH Physical Downlink Shared Channel
PRB Physical Resource Block
PROM Programmable Read Only Memory
PSTN Public Switched Telephone Network
PUCCH Physical Uplink Control Channel
PUSCH Physical Uplink Shared Channel
RAID Redundant Array of Independent Disks
RAM Random Access Memory
RAN Radio Access Network
RAT Radio Access Technology
RF Radio Frequency
RMSI Remaining System Information
RNC Radio Network Controller
RNTI Radio Network Temporary Identifier
ROM Read Only Memory
RRC Radio Resource Control
RRH Remote Radio Head
RRU Remote Radio Unit
RUIM Removable User Identity
SDRAM Synchronous Dynamic Random Access Memory
SIM Subscriber Identity Module
SOC System on a Chip
SON Self Optimized Network
SONET Synchronous Optical Networking
SR Scheduling Request
TCP Transmission Control Protocol
UCI Uplink Control Information
UE User Equipment
UMTS Universal Mobile Telecommunication System
USB Universal Serial Bus
V2I Vehicle-to-Infrastructure
V2V Vehicle-to-Vehicle
V2X Vehicle-to-Everything VMM Virtual Machine Monitor
VNE Virtual Network Element
VNF Virtual Network Function
VoIP Voice over Internet Protocol
WAN Wide Area Network
WCDMA Wideband Code Division Multiple Access
WD Wireless Device
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

What is claimed is:

1. A method performed by a wireless device, the method comprising:
   receiving a first downlink control channel message that schedules a first downlink shared channel transmission;
   receiving a second downlink control channel message that schedules a second downlink shared channel transmission;
   determining an uplink control channel resource to use for transmitting uplink control information to a network node on an uplink control channel, wherein:
      the uplink control information comprises Hybrid Automatic Repeat Request, HARQ, feedback for both the first downlink shared channel transmission and the second downlink shared channel transmission; and wherein
      determining the uplink control channel resource for transmitting the uplink control information comprises determining the uplink control channel resource based on: (a) signaling received from the network node and (b) resource determination performed by the wireless device based on a latest received one of the first downlink control channel message and the second downlink control channel message; and transmitting the uplink control information using the determined uplink control channel resource.

2. The method of claim 1 wherein the uplink control channel is a physical uplink control channel.

3. The method of claim 1 wherein:
   the signaling received from the network node comprises information that provides a semi-static configuration of two or more uplink control channel resource sets each comprising two or more uplink control channel resources; and
   determining the uplink control channel resource based on: (a) the signaling received from the network node and (b) resource determination performed by the wireless device based on the latest received one of the first downlink control channel message and the second downlink control channel message comprises:
      selecting one of the two or more uplink control channel resource sets;
      selecting, as the uplink control channel resource to use for transmitting the uplink control information to the network node, one of the two or more uplink control channel resources from the selected uplink control channel resource set based on dynamic signaling from the network node.

4. The method of claim 3 wherein:
   each of the first downlink control channel message and the second downlink control channel message comprises bits for use to select one of the two or more uplink control channel resources from the selected uplink control channel resource set; and wherein
   selecting the one of the two or more uplink control channel resources comprises selecting based on the bits comprised in the latest received one of the first downlink control channel message and the second downlink control channel message.

5. The method of claim 1, wherein determining the uplink control channel resource to use comprises determining the uplink control channel resource to use when the timing is variable between when the wireless device receives the first and second downlink control channel messages scheduling the first and second downlink shared channel transmissions and when the wireless device transmits the uplink control information.

6. The method of claim 1, wherein determining the uplink control channel resource to use comprises determining the uplink control channel resource to use when the wireless device can receive the first and second downlink control channel messages scheduling the first and second downlink shared channel transmissions in any one of multiple control regions in the same slot.

7. A wireless device comprising:
   an interface; and
   processing circuitry configured to cause the wireless device to:
      receive a first downlink control channel that schedules a first downlink shared channel transmission;
      receive a second downlink control channel that schedules a second downlink shared channel transmission;
      determine an uplink control channel resource to use for transmitting uplink control information to a network node, wherein:
         the uplink control information comprises Hybrid Automatic Repeat Request, HARQ, feedback for both the first downlink shared channel transmission and the second downlink shared channel transmission; and
         determining the uplink control channel resource for transmitting the uplink control information comprises determining the uplink control channel resource based on: (a) signaling received from the network node and (b) resource determination performed by the wireless device based on a latest received one of the first downlink control channel and the second downlink control channel; and
      transmit the uplink control information using the determined uplink control channel resource.

8. The wireless device of claim 7 wherein the uplink control channel is a physical uplink control channel.

9. The wireless device of claim 7, wherein:
   the signaling received from the network node comprises information that provides a semi-static configuration of two or more uplink control channel resource sets each comprising two or more uplink control channel resources; and
   determining the uplink control channel resource based on:
      (a) the signaling received from the network node and
      (b) resource determination performed by the wireless device based on the latest received one of the first downlink control channel message and the second downlink control channel message comprises:
      selecting one of the two or more uplink control channel resource sets;
      selecting, as the uplink control channel resource to use for transmitting the uplink control information to the network node, one of the two or more uplink control channel resources from the selected uplink control channel resource set based on dynamic signaling from the network node.

10. The wireless device of claim 9 wherein:
each of the first downlink control channel message and the second downlink control channel message comprises a downlink control information message comprising bits for use to select one of the two or more uplink control channel resources from the selected uplink control channel resource set; and
selecting the one of the two or more uplink control channel resources from the selected uplink control channel resource set based on dynamic signaling from the network node comprises selecting, as the uplink control channel resource to use for transmitting the uplink control information to the network node, the one of the two or more uplink control channel resources from the selected uplink control channel resource set based on the bits for use to select one of the two or more uplink control channel resources from the selected uplink control channel resource set that are comprised in the latest received one of the first downlink control channel message and the second downlink control channel message.

11. The wireless device of claim 7, wherein determining the uplink control channel resource to use comprises determining the uplink control channel resource to use when the timing is variable between when the wireless device receives the first and second downlink control channel messages scheduling the first and second downlink shared channel transmissions and when the wireless device transmits the uplink control information.

12. The wireless device of claim 7, wherein determining the uplink control channel resource to use comprises determining the uplink control channel resource to use when the wireless device can receive the first and second downlink control channel messages scheduling the first and second downlink shared channel transmissions in any one of multiple control regions in the same slot.

13. A wireless device comprising:
an interface; and
processing circuitry configured to cause the wireless device to:
receive a downlink control channel that schedules a downlink shared channel transmission to the wireless device;
determine an uplink control channel resource to use for transmitting uplink control information to a network node, wherein the uplink control information comprises Hybrid Automatic Repeat Request, HARQ, feedback for the downlink shared channel transmission and determining the uplink control channel resource comprises selecting the uplink control channel resource from uplink control channel resources in two or more uplink control channel resource sets based on:
a payload size of the uplink control information;
a starting control channel element index of a downlink control channel candidate on which the downlink control channel was received; and
dynamic signaling received from the network node; and
transmit the uplink control information using the determined uplink control channel resource.

14. The wireless device of claim 13, wherein the processing circuitry is further configured to cause the wireless device to:
receive, from the network node, signaling comprising information that provides a semi-static configuration of two or more uplink control channel resource sets each comprising two or more uplink control channel resources,
wherein selecting the uplink control channel resource from the two or more uplink control channel resources in the two or more uplink control channel resource sets comprises:
selecting one of the two or more uplink control channel resource sets; and
selecting, as the uplink control channel resource to use for transmitting the uplink control information to the network node, one of the two or more uplink control channel resources from the selected uplink control channel resource set based on dynamic signaling from the network node.

15. The wireless device of claim 14 wherein:
the downlink control channel comprises a downlink control information message comprising bits for use to select one of the two or more uplink control channel resources from the selected uplink control channel resource set; and
selecting the one of the two or more uplink control channel resources from the selected uplink control channel resource set based on dynamic signaling from the network node comprises selecting, as the uplink control channel resource to use for transmitting the uplink control information to the network node, the one of the two or more uplink control channel resources from the selected uplink control channel resource set based on the bits for use to select one of the two or more uplink control channel resources from the selected uplink control channel resource set that are comprised in the downlink control channel.

16. The wireless device of claim 14 wherein the processing circuitry is further configured to cause the wireless device to:
receive, from the network node, signaling comprising information that provides a semi-static configuration of two or more uplink control channel resource sets each comprising two or more uplink control channel resources, and
wherein selecting the uplink control channel resource from the two or more uplink control channel resources in the two or more uplink control channel resource sets comprises:
selecting one of the two or more uplink control channel resource sets based on dynamic signaling from the network node; and
selecting, as the uplink control channel resource to use for transmitting the uplink control information to the network node, one of the two or more uplink control channel resources from the selected uplink control channel resource set using an implicit determination.

17. The wireless device of claim 16 wherein the implicit determination is based on a starting control channel element index of a downlink control channel candidate on which the downlink control channel was received, a search space in which the downlink control channel was received, or a CORESET in which the downlink control channel was received.

18. The wireless device of claim 14 wherein determining the uplink control channel resource to use comprises determining the uplink control channel resource to use when the timing is variable between when the wireless device receives the downlink control channel messages scheduling the downlink shared channel transmission and when the wireless device transmits the uplink control information.

19. The wireless device of claim 14 wherein determining the uplink control channel resource to use comprises determining the uplink control channel resource to use when the wireless device can receive the downlink control channel message scheduling the downlink shared channel transmission in any one of multiple control regions in the same slot.

20. The method of claim 1, wherein determining the uplink control channel resource further comprises selecting the uplink control channel resource from uplink control channel resources in two or more uplink control channel resource sets based on:
  a payload size of the uplink control information;
  a starting control channel element index of the latest received one of the first downlink control channel message and the second downlink control channel message downlink control channel; and
  dynamic signaling received from the network node.

\* \* \* \* \*

UNITED STATES PATENT AND TRADEMARK OFFICE
CERTIFICATE OF CORRECTION

| | |
|---|---|
| PATENT NO. | : 11,064,515 B2 |
| APPLICATION NO. | : 16/382187 |
| DATED | : July 13, 2021 |
| INVENTOR(S) | : Koorapaty et al. |

It is certified that error appears in the above-identified patent and that said Letters Patent is hereby corrected as shown below:

In the Specification

In Column 1, Line 7, delete "2018," and insert -- 2018, now U.S. Pat. No. 10,306,669, --, therefor.

In Column 9, Line 41, delete "Remaining System Information (RMSI)" and insert -- Remaining Minimum System Information (RMSI) --, therefor.

In Column 11, Lines 59-60, delete "remaining system information (RMSI)" and insert -- remaining minimum system information (RMSI) --, therefor.

In Column 42, Line 45, delete "RMSI Remaining System Information" and insert -- RMSI Remaining Minimum System Information --, therefor.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*